(12) United States Patent
List et al.

(10) Patent No.: US 10,583,792 B2
(45) Date of Patent: Mar. 10, 2020

(54) SYSTEM FOR EVALUATING AND/OR OPTIMIZING THE OPERATING BEHAVIOR OF A VEHICLE

(71) Applicant: AVL LIST GMBH, Graz (AT)

(72) Inventors: Helmut List, Graz (AT); Peter Schoeggl, Hitzendorf (AT); Guenter Karl Fraidl, Graz (AT); Thomas Trebitsch, Seiersberg (AT); Erik Bogner, Graz (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 15/307,443

(22) PCT Filed: Apr. 30, 2015

(86) PCT No.: PCT/EP2015/059554
§ 371 (c)(1),
(2) Date: Oct. 28, 2016

(87) PCT Pub. No.: WO2015/166069
PCT Pub. Date: Nov. 5, 2015

(65) Prior Publication Data
US 2017/0050590 A1 Feb. 23, 2017

(30) Foreign Application Priority Data
Apr. 30, 2014 (DE) .......................... 10 2014 006 319

(51) Int. Cl.
*B60W 10/06* (2006.01)
*B60R 16/023* (2006.01)
(Continued)

(52) U.S. Cl.
CPC .......... *B60R 16/0236* (2013.01); *B60L 58/12* (2019.02); *B60W 40/12* (2013.01);
(Continued)

(58) Field of Classification Search
CPC .......................... B60R 16/0236; B60L 11/1861
See application file for complete search history.

(56) References Cited

U.S. PATENT DOCUMENTS 9,180,788 B2 * 11/2015 Harumoto ........... B60L 15/2045
2007/0245721 A1 * 10/2007 Colignon ................ F01N 3/021
60/288

(Continued)

FOREIGN PATENT DOCUMENTS

DE         198 31 487 C1    3/2000
DE    10 2005 034 247 A1    1/2007
(Continued)

OTHER PUBLICATIONS

International Search Report and Written Opinion prepared by the European Patent Office dated Nov. 17, 2015, for International Application No. PCT/EP2015/059554.
(Continued)

*Primary Examiner* — Jess Whittington
(74) *Attorney, Agent, or Firm* — Sheridan Ross P.C.

(57) ABSTRACT

The invention relates to a system comprising a plurality of first sensors to measure parameters characterizing a vehicle operating state; a second sensor to measure a parameter characterizing an emission of an fuel processing apparatus; a control device to measure repeatedly over a predefined time period and to determine a vehicle operating state based on a first data set with measured values from the plurality of first sensors and predefined parameter ranges describing a predefined vehicle operating state; an allocation device to allocate a second data set comprising measured values from the second sensor to the predefined vehicle operating state; and an evaluation device to determine a characteristic value for assessing or optimizing the operating behavior of the vehicle based on the vehicle operating state and the second data set, wherein the characteristic value characterizes an (Continued)

Figure 1:
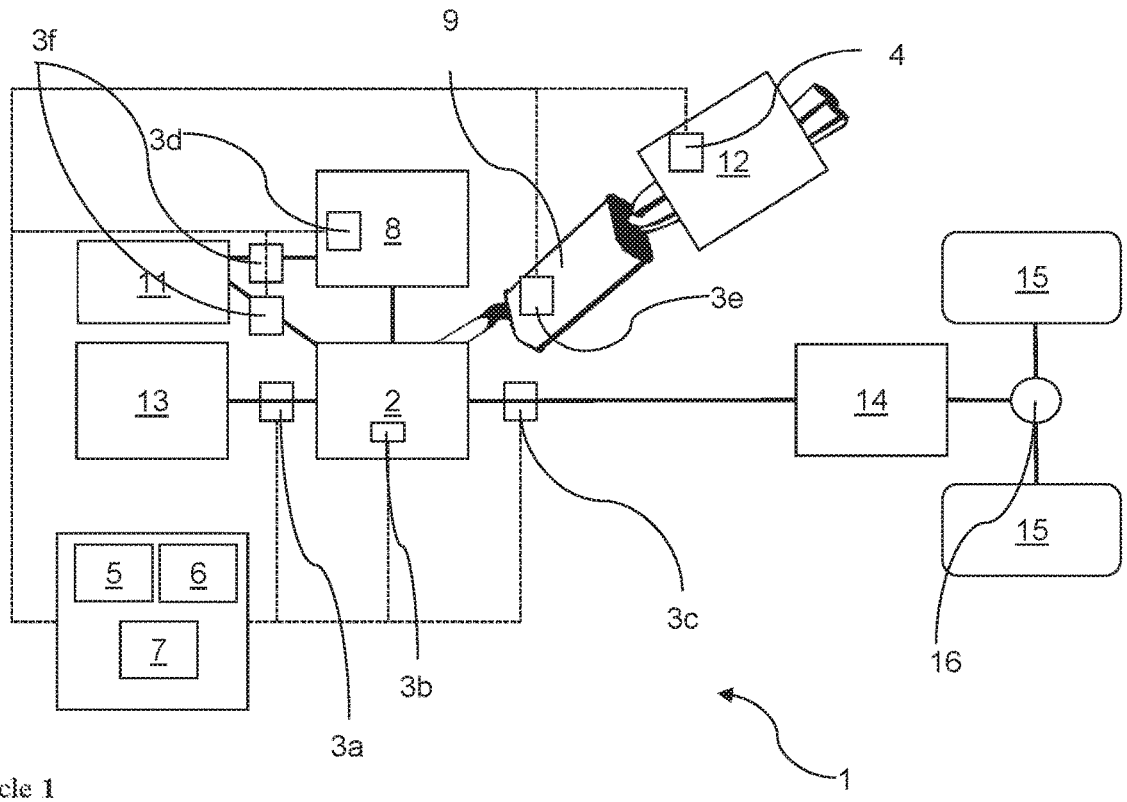

energy efficiency of the vehicle or an emission behavior of the fuel processing apparatus.

17 Claims, 18 Drawing Sheets

(51) Int. Cl.
| | |
|---|---|
| *B60W 40/12* | (2012.01) |
| *B60L 58/12* | (2019.01) |
| *G01M 17/007* | (2006.01) |
| *B60W 50/00* | (2006.01) |
| *G01M 17/00* | (2006.01) |

(52) U.S. Cl.
CPC .. *G01M 17/007* (2013.01); *B60W 2050/0018* (2013.01); *B60W 2530/12* (2013.01); *B60W 2530/14* (2013.01); *G01M 17/00* (2013.01); *Y02T 90/34* (2013.01)

(56) References Cited

U.S. PATENT DOCUMENTS

| | | | | |
|---|---|---|---|---|
| 2008/0262712 | A1* | 10/2008 | Duty | B60W 10/02 701/123 |
| 2009/0192655 | A1* | 7/2009 | Ichikawa | B60L 11/1811 700/291 |
| 2010/0023202 | A1 | 1/2010 | Schoeggle et al. | |
| 2010/0211247 | A1* | 8/2010 | Sherony | B60W 30/1882 701/31.4 |
| 2011/0066308 | A1* | 3/2011 | Yang | B60W 20/11 701/22 |
| 2011/0184575 | A1* | 7/2011 | Kawamoto | G06Q 50/06 700/292 |
| 2012/0227377 | A1 | 9/2012 | Hopka et al. | |
| 2013/0054060 | A1* | 2/2013 | Dupuy | F02D 17/04 701/22 |
| 2013/0158832 | A1* | 6/2013 | Moeckly | F02C 9/00 701/101 |
| 2014/0129070 | A1* | 5/2014 | Lutz | B60W 10/06 701/22 |

FOREIGN PATENT DOCUMENTS

| | | |
|---|---|---|
| DE | 10 2006 018 956 A1 | 10/2007 |
| DE | 10 2006 022 383 A1 | 11/2007 |
| DE | 102007053406 | 6/2009 |
| EP | 2 148 182 A2 | 1/2010 |
| EP | 2343208 | 7/2011 |
| EP | 1229311 | 6/2015 |
| JP | H04-262237 | 9/1992 |
| JP | 2000-247162 | 9/2000 |
| JP | 2002-227711 | 8/2002 |
| JP | 2004-157842 | 6/2004 |
| JP | 2004-309290 | 11/2004 |
| JP | 2005-291081 | 10/2005 |
| JP | 2008-026261 | 2/2008 |
| JP | 2010-083276 | 4/2010 |
| JP | 2010-102699 | 5/2010 |
| JP | 2011-253239 | 12/2011 |
| WO | WO 2012/077425 | 6/2012 |
| WO | WO 2010/122666 | 10/2012 |

OTHER PUBLICATIONS

Search Report prepared by the German Patent Office dated Jan. 7, 2015, for German Application No. 10 2014 006 319.4.
International Report for Patentability for International (PCT) Patent Application No. PCT/EP2015/059554, dated Nov. 10, 2016, 12 pages.
Official Action with English Translation for China Patent Application No. 201580023411.5, dated Jul. 30, 2018, 14 pages.
Official Action with English Translation for Japan Patent Application No. 2016-565225, dated Aug. 23, 2018, 12 pages.
Official Action with English Translation for China Patent Application No. 201580023411.5, dated Apr. 22, 2019, 16 pages.
Official Action with Machine Translation for Japan Patent Application No. 2016-565225, dated Jul. 22, 2019, 13 pages.

* cited by examiner vehicle 1
fuel processing apparatus 2
first sensor 3a, 3b, 3c, 3d, 3e, 3f, 3g
second sensor 4
control device 5
allocation device 6
evaluation device 7
auxiliary equipment 8
exhaust treatment apparatus 9
electric motor 10
charge storage device 11
exhaust analysis device 12
fuel reservoir 13
transmission 14
wheels 15
differential 16
generator 17
exhaust system 18
electronic unit 19 vehicle 1
fuel processing apparatus 2
first sensor 3a, 3b, 3c, 3d, 3e, 3f, 3g
second sensor 4
control device 5
allocation device 6
evaluation device 7
auxiliary equipment 8
exhaust treatment apparatus 9
electric motor 10
charge storage device 11
exhaust analysis device 12
fuel reservoir 13
transmission 14
wheels 15
differential 16
generator 17
exhaust system 18
electronic unit 19 vehicle 1
fuel processing apparatus 2
first sensor 3a, 3b, 3c, 3d, 3e, 3f, 3g
second sensor 4
control device 5
allocation device 6
evaluation device 7
auxiliary equipment 8
exhaust treatment apparatus 9
electric motor 10
charge storage device 11
exhaust analysis device 12
fuel reservoir 13
transmission 14
wheels 15
differential 16
generator 17
exhaust system 18
electronic unit 19

100 Method
101 Acquiring a first data set
102 Acquiring a second data set
103 Repeating steps 101 and 102
104 Comparing the measured values
105 Allocating the measured values
106 Determining the energy used by the vehicle
107 Determining the energy supplied by the fuel processing apparatus
108 Adjusting an allocation
109 Determining a charatericstic value

SYSTEM FOR EVALUATING AND/OR OPTIMIZING THE OPERATING BEHAVIOR OF A VEHICLE

CROSS REFERENCE TO RELATED APPLICATIONS

This application is a national stage application under 35 U.S.C. 371 and claims the benefit of PCT Application No. PCT/EP2015/059554 having an international filing date of 30 Apr. 2015, which designated the United States, which PCT application claimed the benefit of German Patent Application No. 10 2014 006 319.4 filed 30 Apr. 2014, the disclosure of each of which are incorporated herein by reference in their entireties.

The invention relates to a system for assessing and/or optimizing the operating behavior of a vehicle having at least one apparatus for fuel processing, particularly a combustion engine and/or a fuel cell.

Motor vehicle energy efficiency is increasingly gaining in importance, both as a selling point for customers against the backdrop of increasing energy costs as well as for legislators against the backdrop of needing to reduce vehicle environmental pollution in the context of climate protection objectives.

DE 10 2005 034 247 A1 discloses a method for monitoring an exhaust gas limit value of a combustion engine using an engine controller, whereby the engine controller has at least one exhaust gas sensor and an error signal is output upon the exhaust gas limit value being exceeded, wherein the emissions predicted for the current driving state are determined by means of an engine model and compared to the signal of the exhaust gas sensor or a comparison value for the emission derived therefrom.

DE 10 2007 053 406 B3 discloses a method for performing at least part of an adaptation and diagnosis of a vehicle's emission-relevant control devices comprising the steps of: determining whether the vehicle has reached a defined driving state; performing a diagnosis of at least one of the emission-relevant control devices when it is determined that the vehicle has reached the defined driving state, whereby the diagnosis determines and optimizes at least one parameter of an operating point of at least one emission-relevant control device upon same deviating from a target range or target value; and performing at least one adaptation step of the adaptation on at least one emission-relevant control device, whereby at least one parameter of a plurality of operating points of the emission-relevant control devices is determined and optimized during the adaptation when same deviates from a target range or target value.

One task of the invention is that of providing an apparatus with which a vehicle's energy efficiency and/or emission behavior data can be improved by means of a fuel processing apparatus.

A system in accordance with claim 1 as well as a method in accordance with claim 8 is proposed to solve this task. Advantageous embodiments of the invention are claimed in the subclaims.

The inventive system enables the emissions of a fuel processing apparatus to be plotted over a predefined length of time. The profile of the emissions over the predefined time period is associated with the respective vehicle operating state at that given time, whereby the emissions profile during a vehicle operating state or between different vehicle operating states can be identified. A multitude of information relevant to the operating behavior of a vehicle can be obtained from the emissions profile, in particular the environmental compatibility of the vehicle, the energy consumption of the vehicle and also the energy efficiency of the vehicle. On the basis of this information, a characteristic value reflective of an advantageous or less advantageous configuration of the vehicle control or the vehicle components can be determined. This characteristic value can be used to at least assess the operating behavior of the vehicle and additionally or alternatively implement an optimization of same.

The invention is thereby based on the realization that the emissions profile information for a fuel processing apparatus or a vehicle respectively contains a multitude of information on the operation of the vehicle. Each act which a driver or even a driver assistance system performs and each power unit operation for the propulsion of the vehicle or even that of auxiliary equipment is reflected in the vehicle's emissions. By evaluating these emissions, a holistic assessment and/or optimization of the operating behavior of the vehicle can ensue.

The invention enables in-depth causes to be concluded for a vehicle's emission and/or energy efficiency and/or poor emission values and low energy efficiency.

The inventive system can be used in an actual vehicle or on a test bed.

An apparatus for fuel processing within the meaning of the invention is an apparatus which converts the energy existing in the fuel into mechanical work or electrical energy.

A vehicle within the meaning of the invention is a mobile means of transportation serving in the transporting of goods or people. This preferably relates to ground vehicles, watercraft or aircraft, particularly a passenger car or a truck.

A plurality within the meaning of the invention is

A sensor within the meaning of the invention is a measurement variable sensor. This is hereby a technical component able to detect specific physical or chemical characteristics and/or the material composition of its environment qualitatively or quantitatively as a measured variable. In particular, these variables are detected by means of physical or chemical effects and converted into a processed electrical signal.

A vehicle operating state within the meaning of the invention characterizes a vehicle's operation at one point in time. In particular, a vehicle operating state is a collective operating state of the vehicle characterizing the driving state as well as the operating state of the vehicle's power units and auxiliary equipment used in its propulsion.

An operating behavior in the sense of the invention is a sequence of operating states.

An operating state within the meaning of the invention is any possible operation of an apparatus. In the example of a combustion engine, operating state signifies preferably both operation of the combustion engine in a steady state; i.e. for example operation during idling or operation in a vehicle at constant speed and constant load, as well as operation in a dynamic/transient state; i.e. for example an acceleration of the combustion engine. An operating state is thereby preferably both a snapshot of a combination of parameters as well as al-ternatively a chronological sequence of parameters, e.g. the gas pedal position, or is also alternatively defined by an initial and final parameter point, for example by velocity values at a predetermined degree of throttle valve opening.

An energy efficiency in the sense of the invention is a measure of the energy expended to achieve a specific use. A process is particularly efficient when a specific use can be achieved at minimum energy expenditure. Preferably, a degree of efficiency is at least one component of the energy efficiency.

An emission behavior within the meaning of the invention is a profile of emissions over a predefined length of time or a profile of the emissions over a predefined distance, wherein time and distance are in particular linked to a speed profile.

A driving state within the meaning of the invention characterizes the dynamics of a vehicle. Examples of driving states are preferably starting and/or starting sequence, acceleration, tip-in, tip-out, deceleration, gear shifting, rolling at constant speed, idling, engine start, engine stop.

A driving state can also be further broken down into sub-driving states. In extreme cases, each combination of parameter values is associated with a sub-driving state. A driving state thereby preferably refers to steady-state and transient states of the driving operation which indicate the transition from a first steady driving state to a second steady driving state.

In one advantageous embodiment, the plurality of first sensors of the inventive system are designed to measure a parameter which characterizes at least one driving state of the vehicle and at least one further parameter which characterizes at least one property selected from among the following group: an operating state of at least one auxiliary equipment unit, particularly an air conditioning system, an alternator or a fan, an operating state of at least one apparatus for treating exhaust gas, particularly a particulate filter or a catalytic converter, an ambient temperature, a position of the vehicle, and an operating state of the fuel processing apparatus.

If a vehicle is operated not only with the fuel processing apparatus but also with further apparatus which use energy, the emission behavior of the vehicle then also depends on the operating states of these apparatus. Knowledge of the operating states of the further apparatus within the vehicle is also of importance to an assessment of the emission behavior. Thus, the regeneration of a particulate filter at a point in time in which the fuel processing apparatus would be running at ideal efficiency is not efficient from an energy standpoint. On the other hand, regeneration at another point in time can be efficient from an energy standpoint, for example when increased output of the fuel processing apparatus for regeneration of a particulate filter leads to the fuel processing apparatus being operated at optimum efficiency.

In a further advantageous embodiment, the evaluation device of the inventive system is further designed to determine the energy consumed by the vehicle on the basis of the second data set and determine the energy supplied by the fuel processing apparatus for the drive of the vehicle, particularly work, on the basis of the first data set, particularly an operating state of the fuel processing apparatus, and to calculate a ratio of supplied energy to consumed energy.

Particularly advantageously, the inventive system provides the possibility of calculating the energy consumed by the vehicle in achieving specific driving states based on the vehicle's emissions. This information enables easily determining the energy efficiency and/or the efficiency of the vehicle operation.

In a further advantageous embodiment, the control device of the system is designed to take multiple measurements such that the first data set comprises a plurality of different vehicle operating states.

The invention is particularly well-suited to analyzing the operating behavior of the vehicle over a longer period of time during which there are multiple vehicle operating states, particularly driving states. Doing so enables analyzing the influence which the vehicle operating states have on each other.

In one further advantageous embodiment of the system, the vehicle comprises at least one electric motor for generating vehicle drive, whereby the plurality of first sensors is furthermore designed to measure at least one parameter characterizing the state of charge of a charge storage device and/or at least one parameter characterizing an operating state of the electric motor, and wherein the evaluation unit is furthermore designed to further determine the at least one characteristic value for assessing and/or optimizing the vehicle on the basis of these measured values.

The system according to the invention is particularly well-suited to assessing and/or optimizing the operating behavior of a hybrid vehicle as well as an electric vehicle having a range extender and/or fuel cell. In this case, the invention can analyze the total energy efficiency of the complex systems of fuel processing apparatus, electric motor and charge storage device. Preferably, the feasibility of the charge storage device being able to be charged by an external energy source (plug-in) can hereby also be incorporated into an emissions balance and/or the energy efficiency balance. Furthermore, it is preferably possible to effect an optimization as to energy costs on the basis of the energy efficiency calculations.

In a further advantageous embodiment, the at least one second sensor, which in particular is a component of an exhaust analysis device, is disposed within the exhaust system, particularly at the end of the exhaust system.

In principle, the second sensor for determining the emission of the fuel processing apparatus can be disposed within the apparatus itself. Preferably, however, the second sensor is disposed at the end of the exhaust system so as to also factor in potential influences from exhaust gas treatment apparatus.

The aspects of the invention described above and the associated features disclosed with respect to the further development of the inventive system also apply to the aspects of the invention described below and the associated further development of the inventive method and vice versa.

The inventive method can be realized on an actual vehicle as well as on a test bed in which a combustion engine can implement the operating states requisite to the inventive method application by way of simulation.

In one advantageous embodiment of the inventive method, in the determining of a characteristic value, at least one target value corresponding to a target energy efficiency and/or a target emission behavior for the at least one vehicle operating state is determined for the at least one parameter of the second group of parameters on the basis of a vehicle model, particularly a model for the fuel processing apparatus, and compared to the first data set.

The providing of a model and the calculating of optimum theoretical values enables the operating behavior of the vehicle to be assessed and/or optimized against absolute criteria. While doing so will ideally prevent an iterative procedure, the number of iteration loops can at the least be reduced.

Given a complete and verified total model for a fuel processing apparatus and/or vehicle, the inventive method can of course also be implemented solely on the basis of the values calculated by the model. Meaning that in this case, the assessment and/or optimization ensues by simulation.

In a further advantageous embodiment, a plurality of first and second data sets acquired in procedural steps S1 and S2 are factored into the determination of the at least one characteristic value.

In a further advantageous embodiment of the inventive method, the first group of parameters which characterize a driving state of the vehicle includes at least one further parameter which characterizes at least one property selected from the following group: an operating state of at least one auxiliary equipment unit, particularly an air conditioning system or a fan, an operating state of at least one apparatus for treating exhaust gas, particularly a particulate filter, an ambient temperature, a roadway slope, a position of the vehicle, and an operating state of the fuel processing apparatus.

In a further advantageous embodiment of the inventive method, same comprises the following procedural step: determining the energy consumed by the vehicle on the basis of the second data set; determining the energy supplied by the fuel processing apparatus for the drive of the vehicle, particularly work, on the basis of the first data set, particularly an operating state of the fuel processing apparatus, whereby the determination of the characteristic value for the assessment and/or optimization of the vehicle's operating behavior preferably comprises at least an undercutting of the supplied energy/consumed energy ratio of the calculation. This enables the efficiency of the vehicle or of the fuel processing apparatus respectively to thereby be calculated.

In a further advantageous embodiment of the inventive method, the measured values of the second data set are integrated over the duration of the respective driving state. The integration and/or summation allows for example calculating total emission during a driving state.

In a further advantageous embodiment of the inventive method, the measured values of a plurality of second data sets for the same type of driving state are consolidated in the determining of the at least one characteristic value.

Doing so enables a global characteristic value to be determined for one type of driving state.

In a further advantageous embodiment of the inventive method, same comprises the further procedural step of adjusting an allocation of the measured values of the second data set to the at least one predefined driving state by a signal propagation delay, the exhaust analysis time and/or exhaust period.

Particularly the exhaust analysis time and/or exhaust period from the formation of emission to the second sensor can lead to a considerable delay between the vehicle operating states, in particular driving states, and the emissions. Delaying the emission point by the exhaust period at that moment is thus important to an emission cause determination. The exhaust period can theoretically be determined from the air displaced by a fuel processing apparatus and the diameter of the exhaust system. Alternatively, the exhaust period can be determined in real terms by adding an additive to the exhaust gas or by means of a periodically occurring exhaust component.

In a further advantageous embodiment of the inventive method, the vehicle has at least one electric motor for the vehicle drive and a charge storage device, wherein the first data set exhibits the further measured values of at least one parameter characterizing the state of charge of a charge storage device and measured values of a parameter characterizing an operating state of the electric motor, and wherein the at least one characteristic value for the assessment and/or optimization of the operating behavior of the vehicle is further determined on the basis of these measured values.

Figure 2:
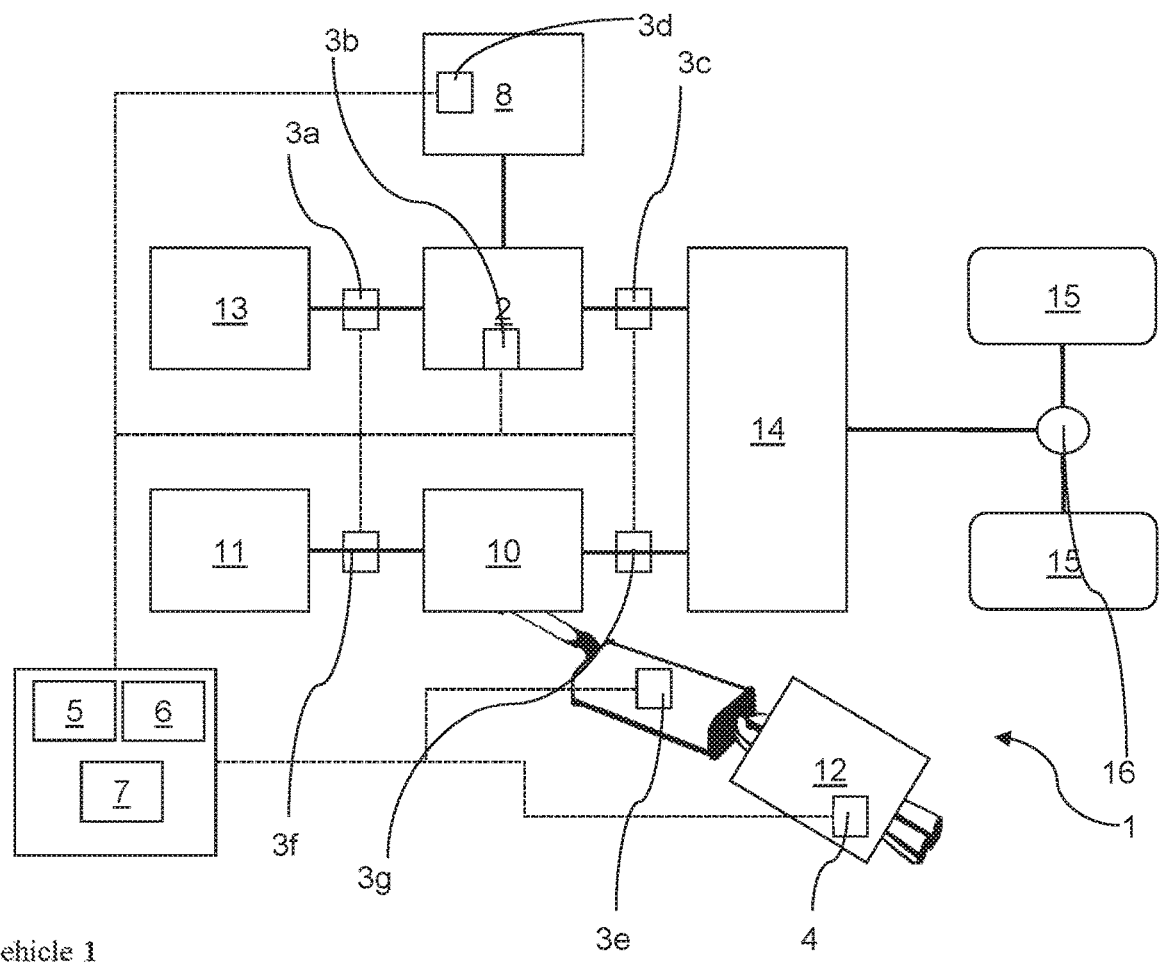
Figure 3:
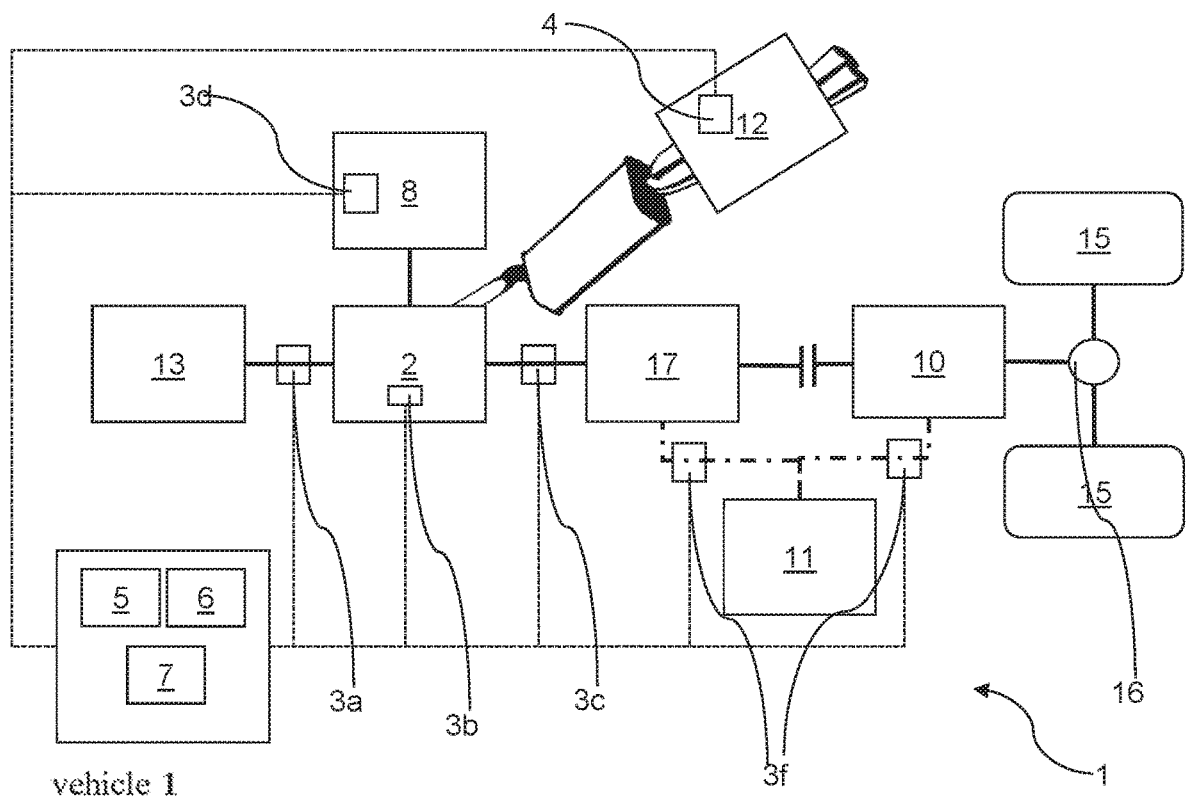
Figure 4:
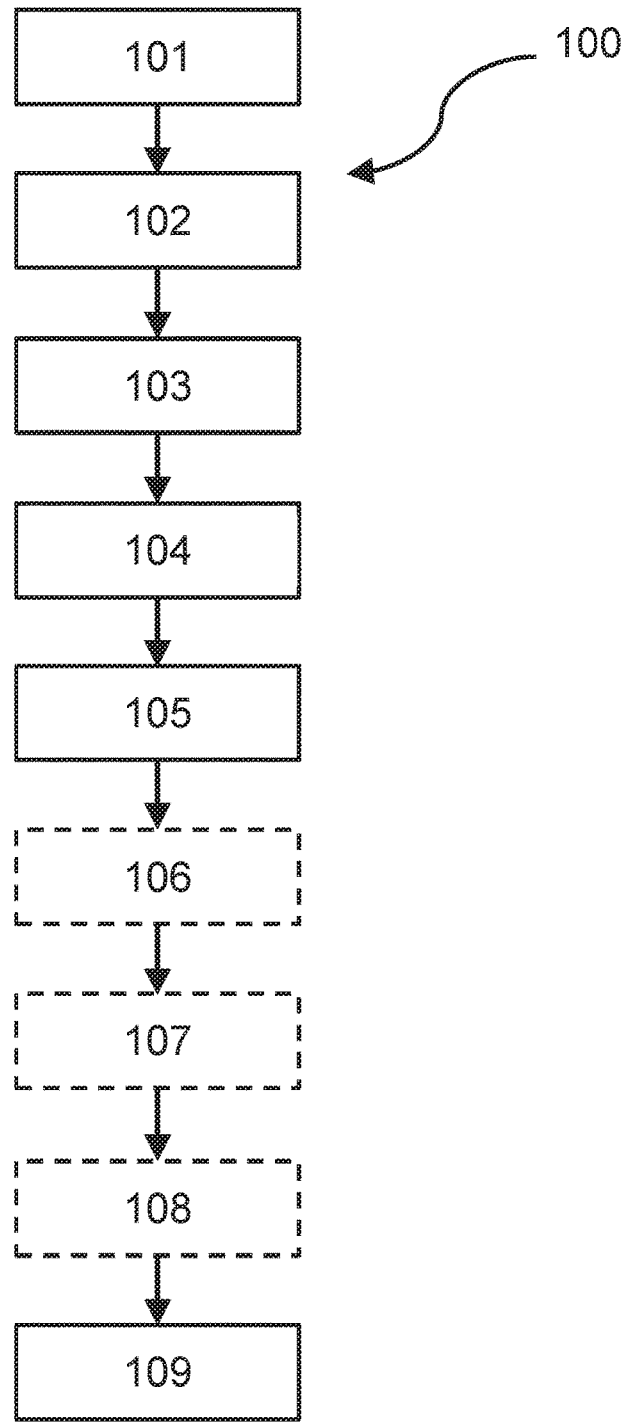
Figure 5:
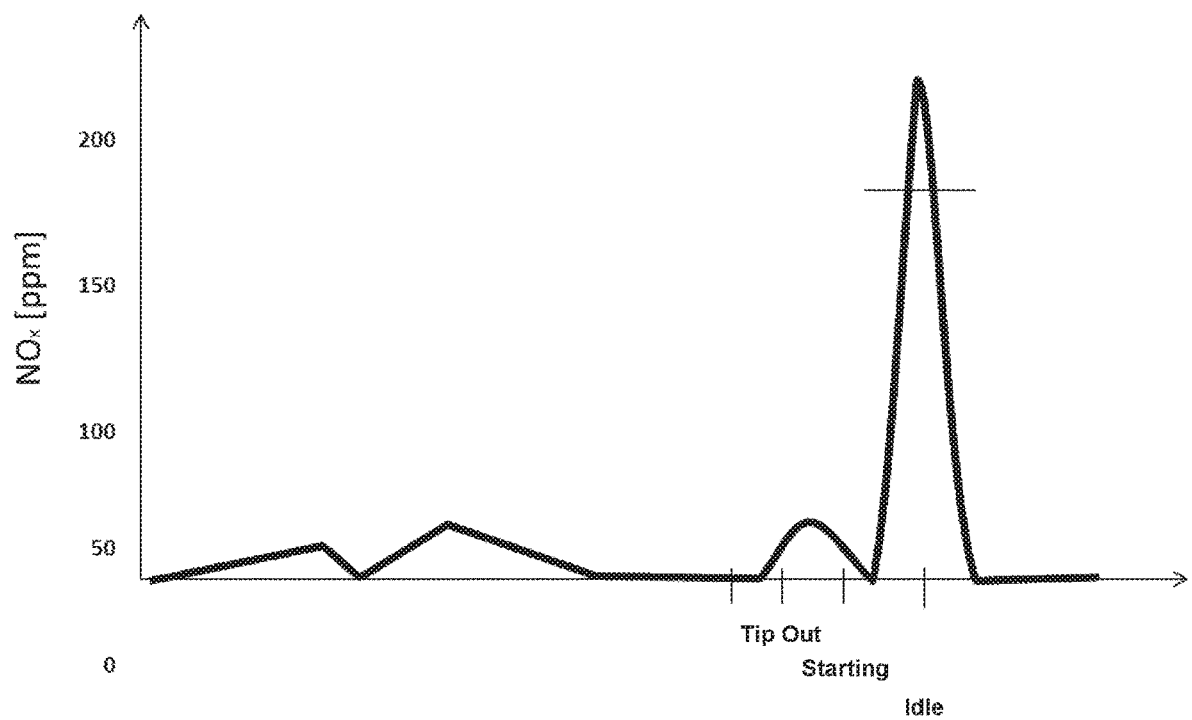
Figure 6:
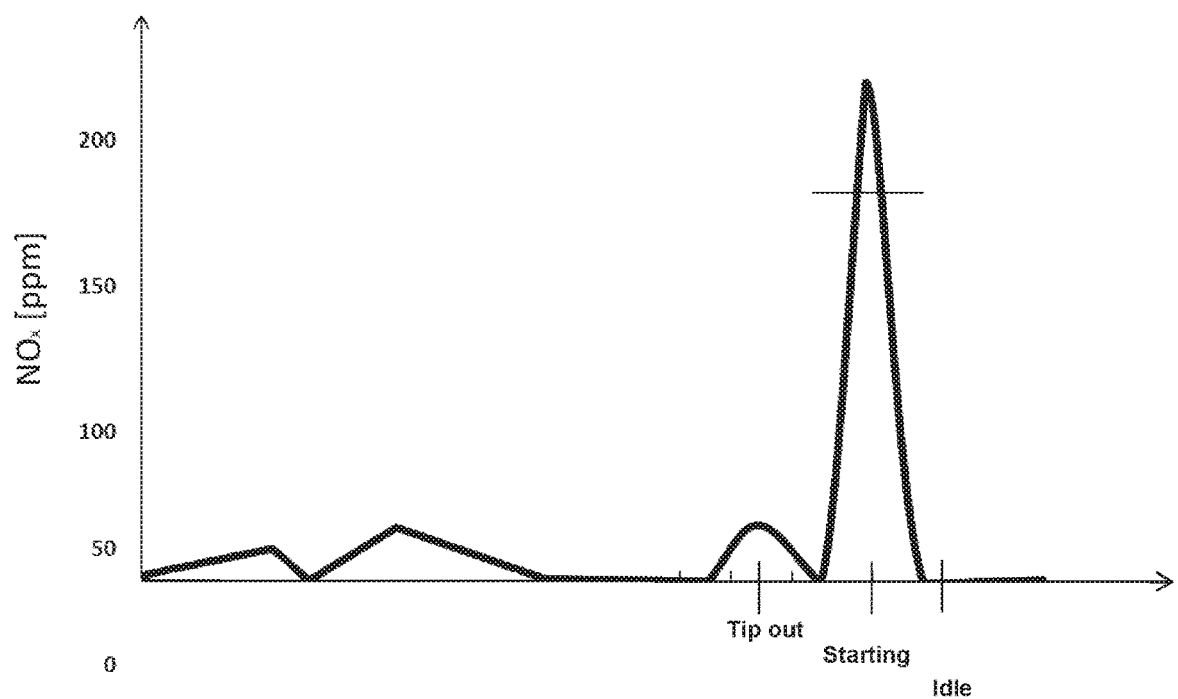
Figure 7:
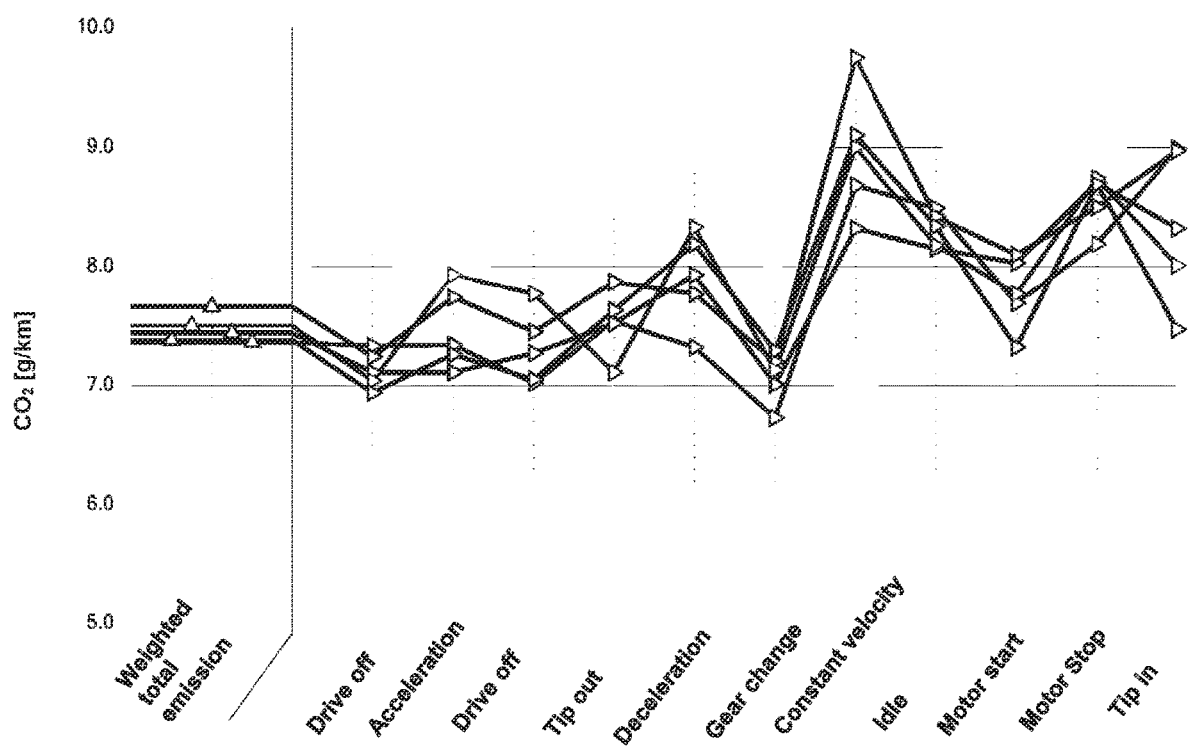
Figure 8:
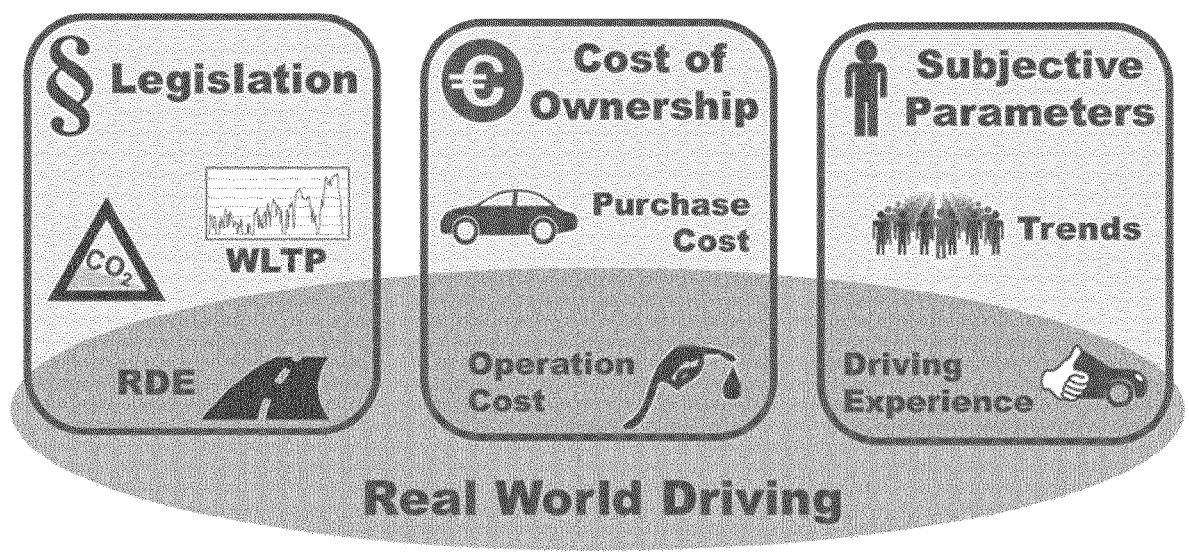
Figure 9:
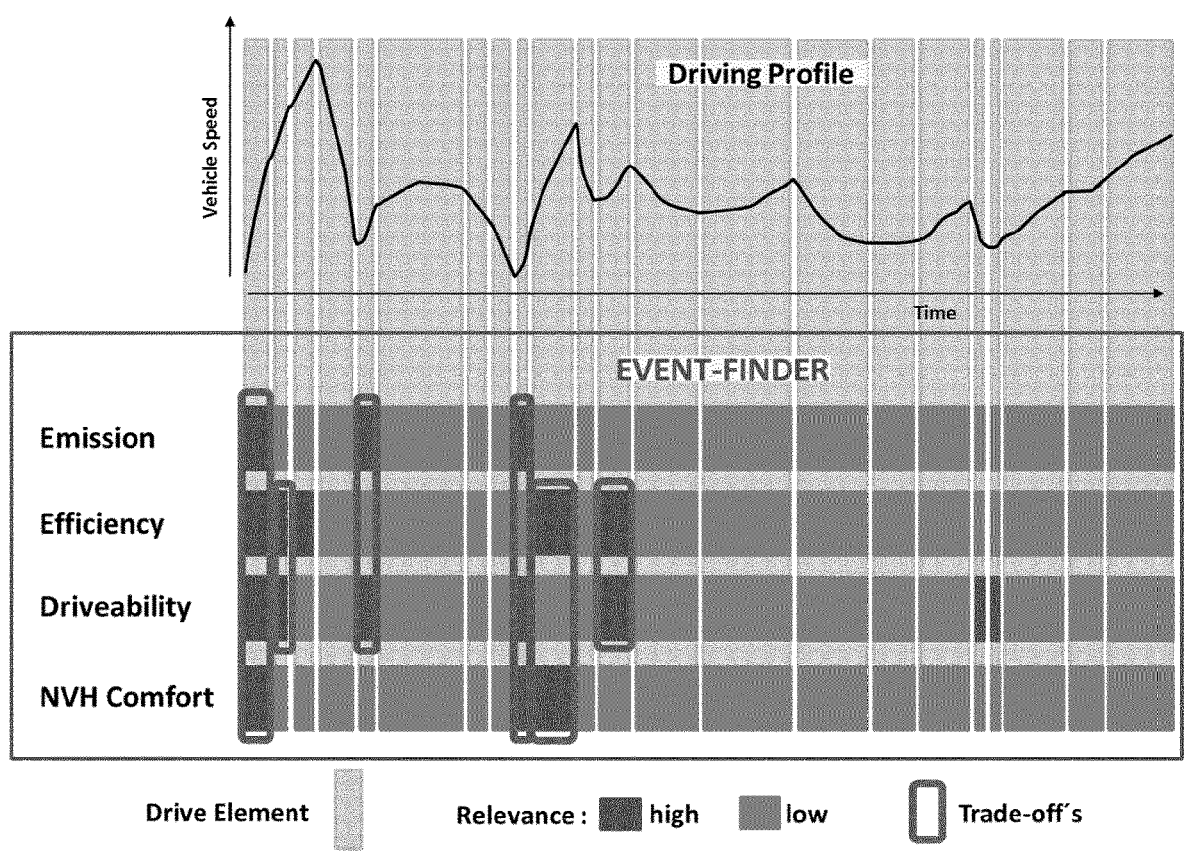
Figure 10:
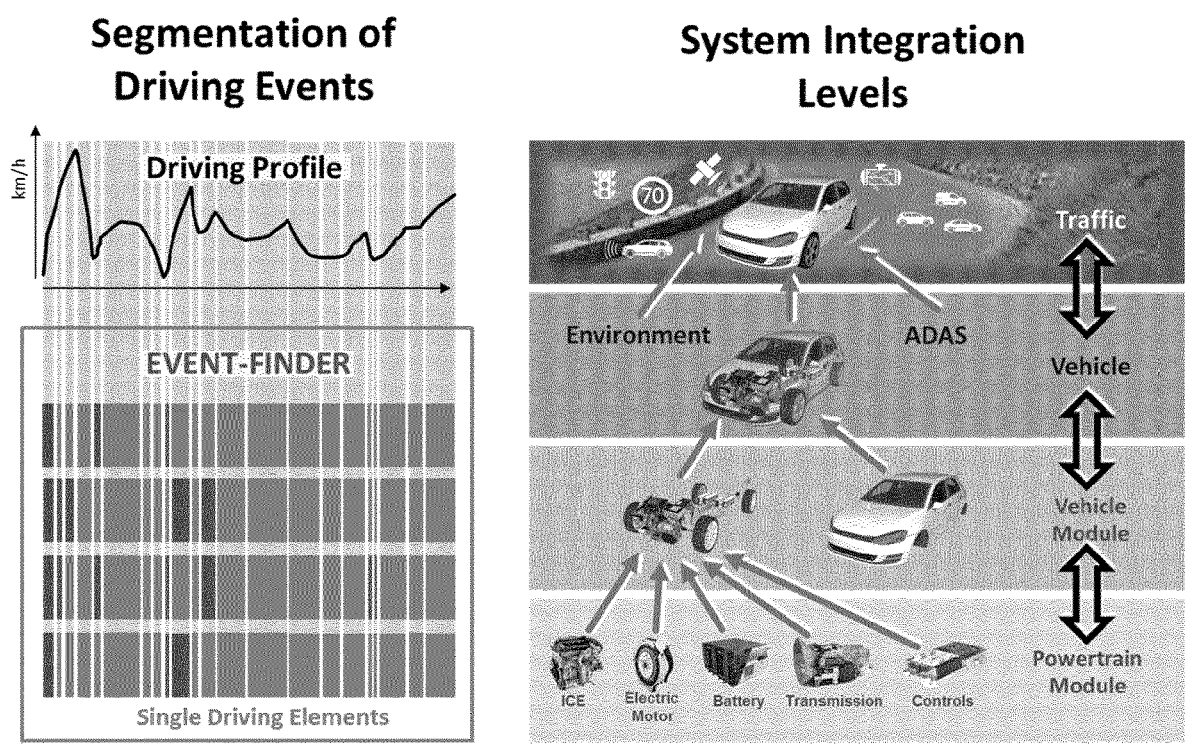
Figure 11:
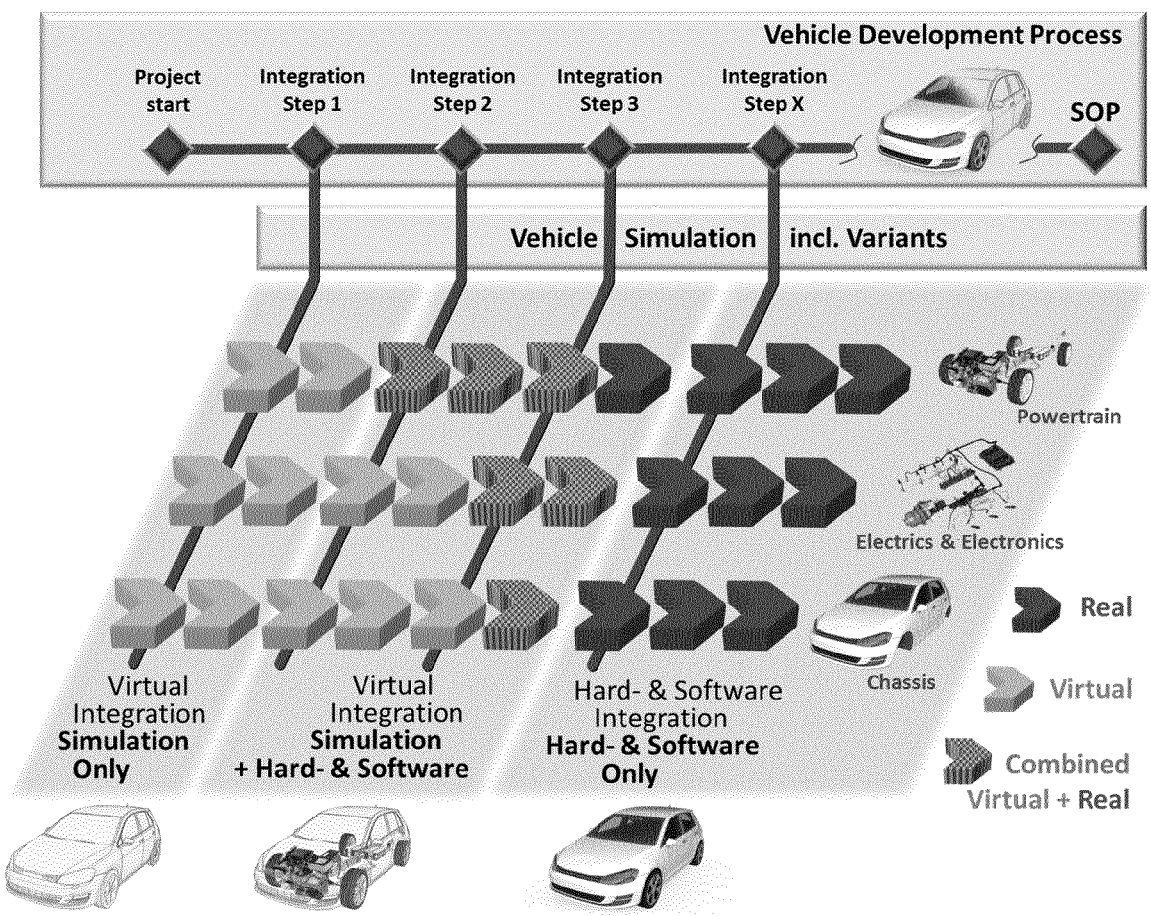
Figure 12:
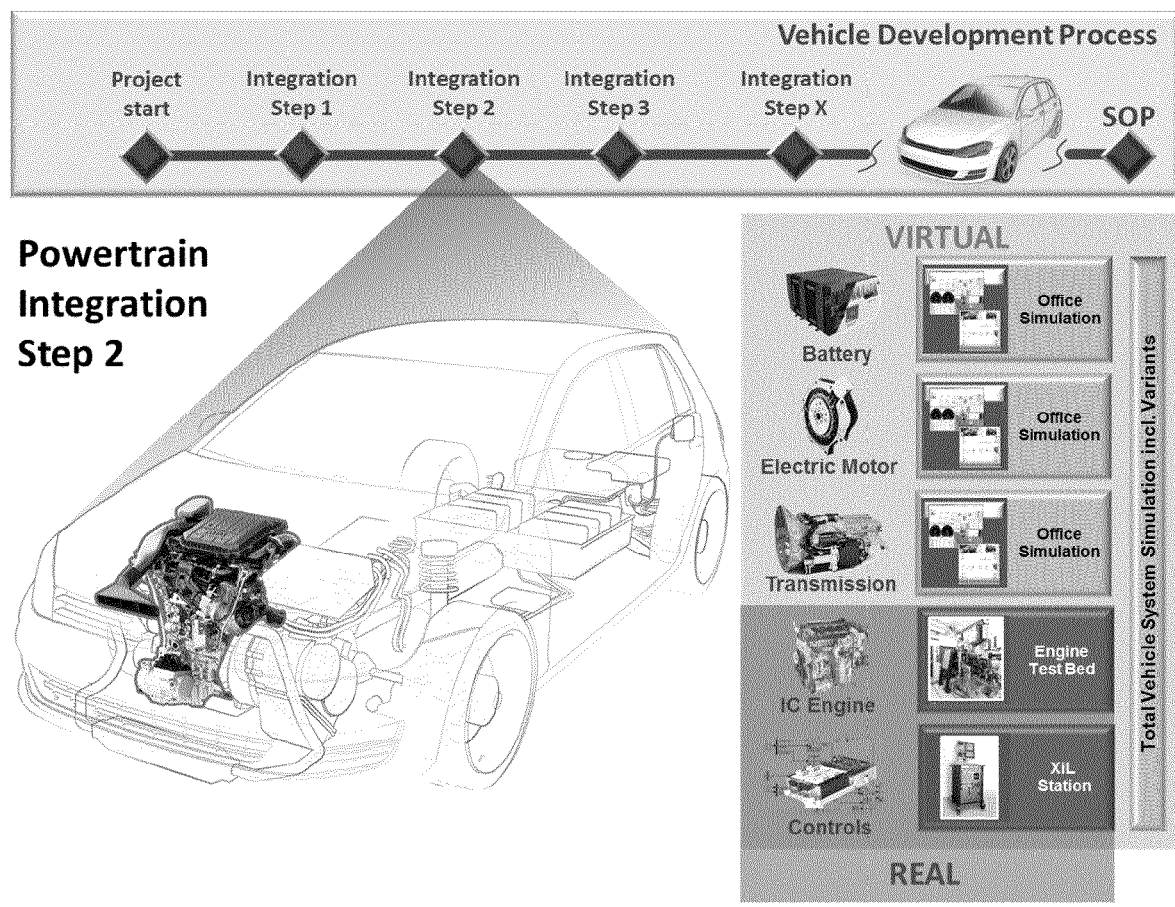
Figure 13:
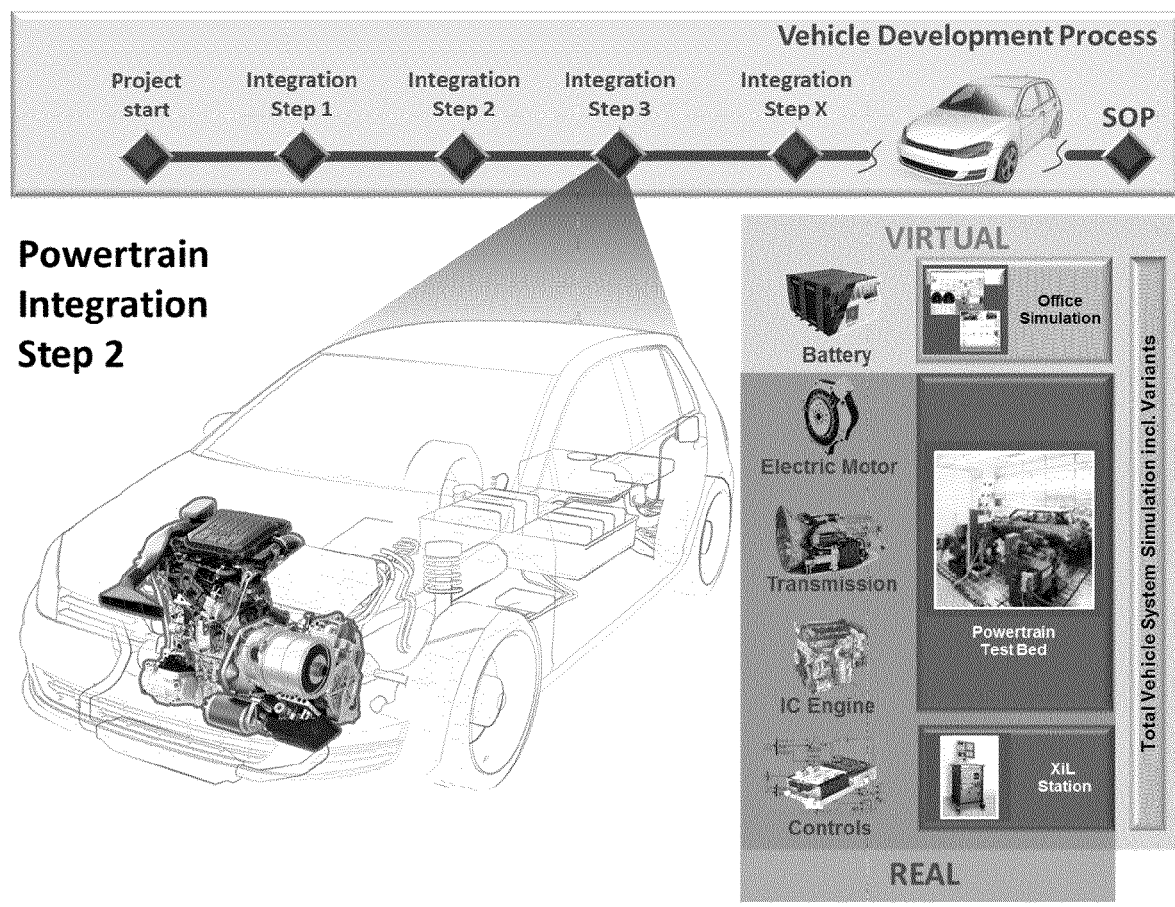
Figure 14:
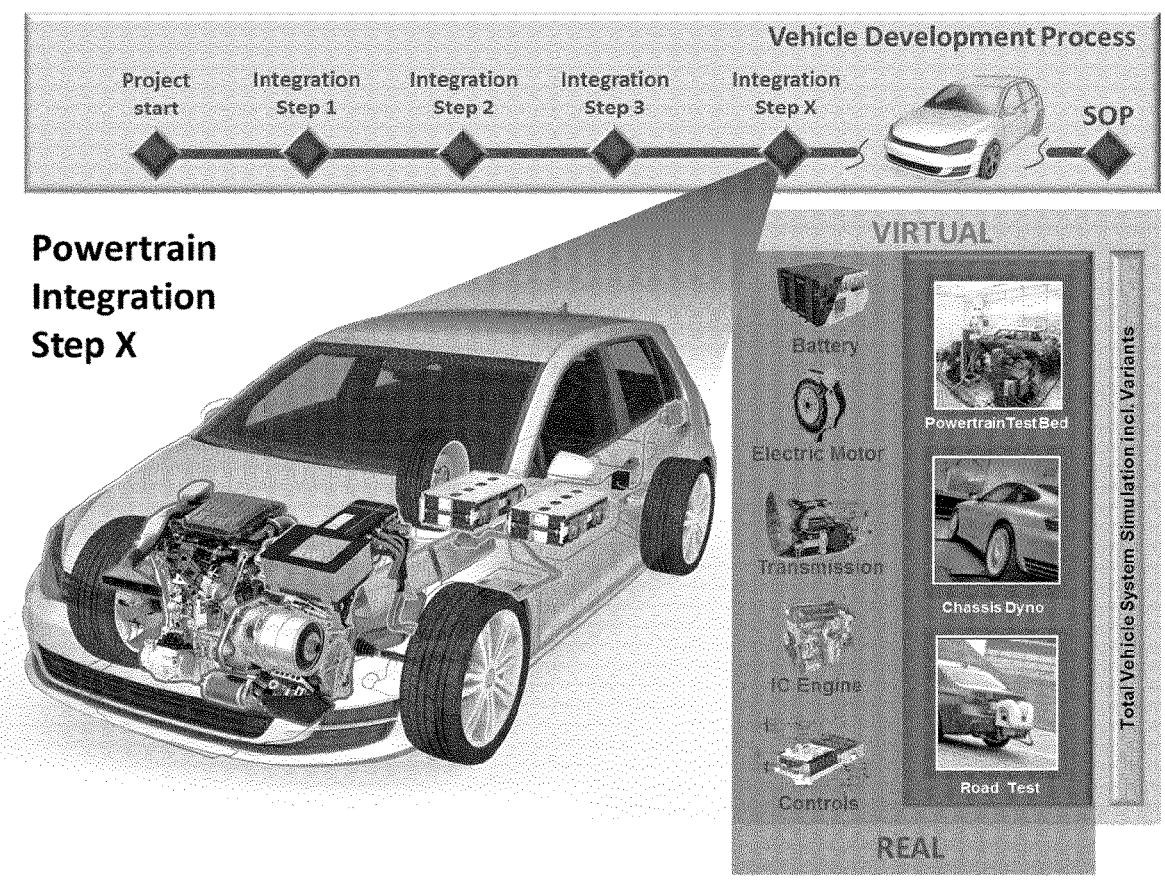
Figure 15:
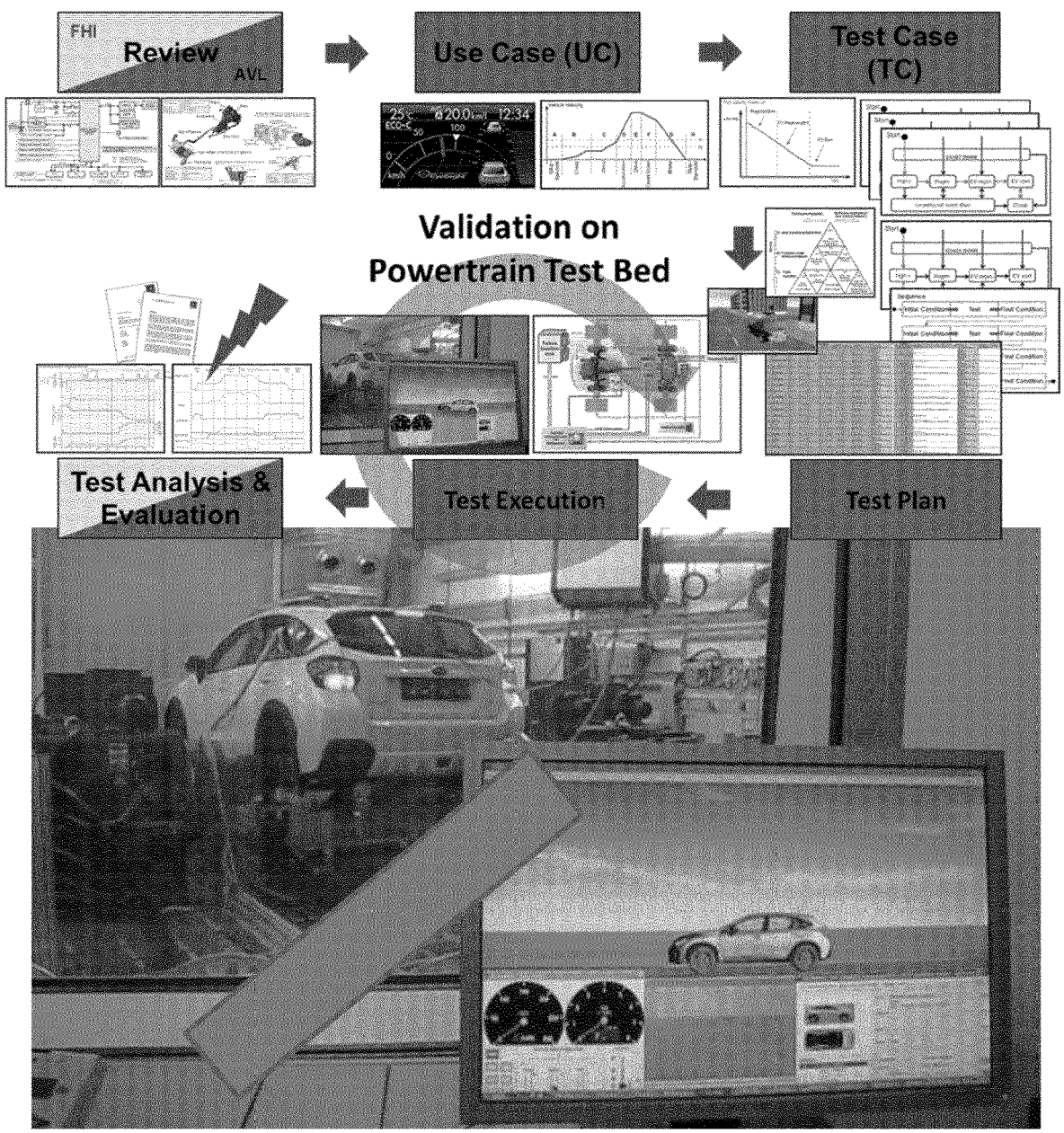
Figure 16:
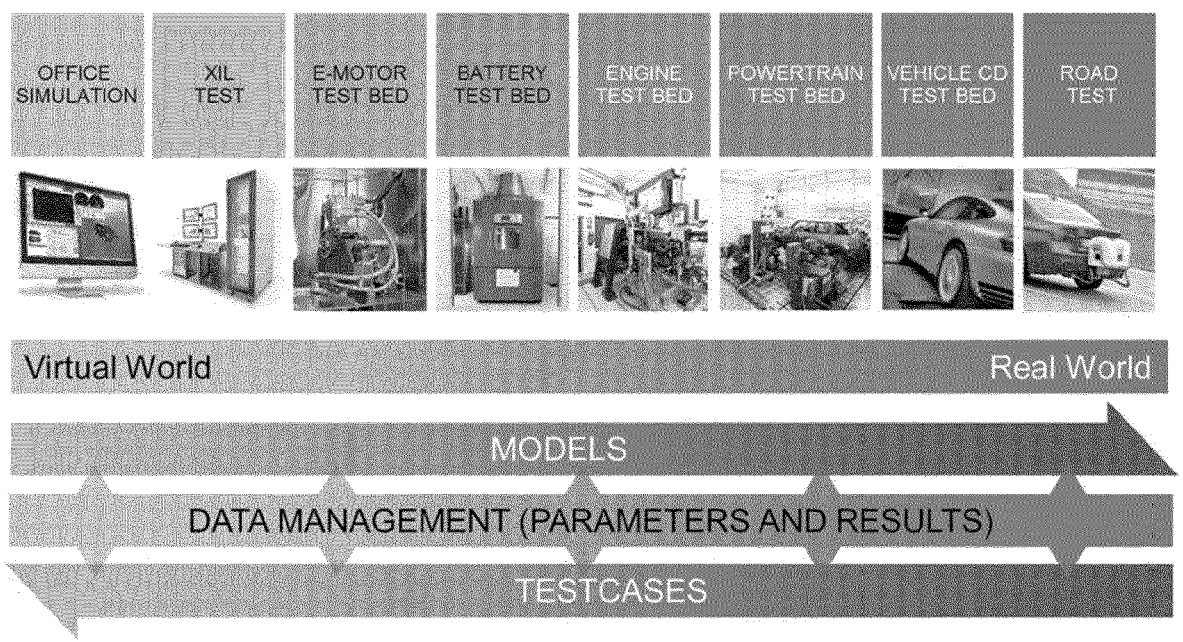
Figure 17:
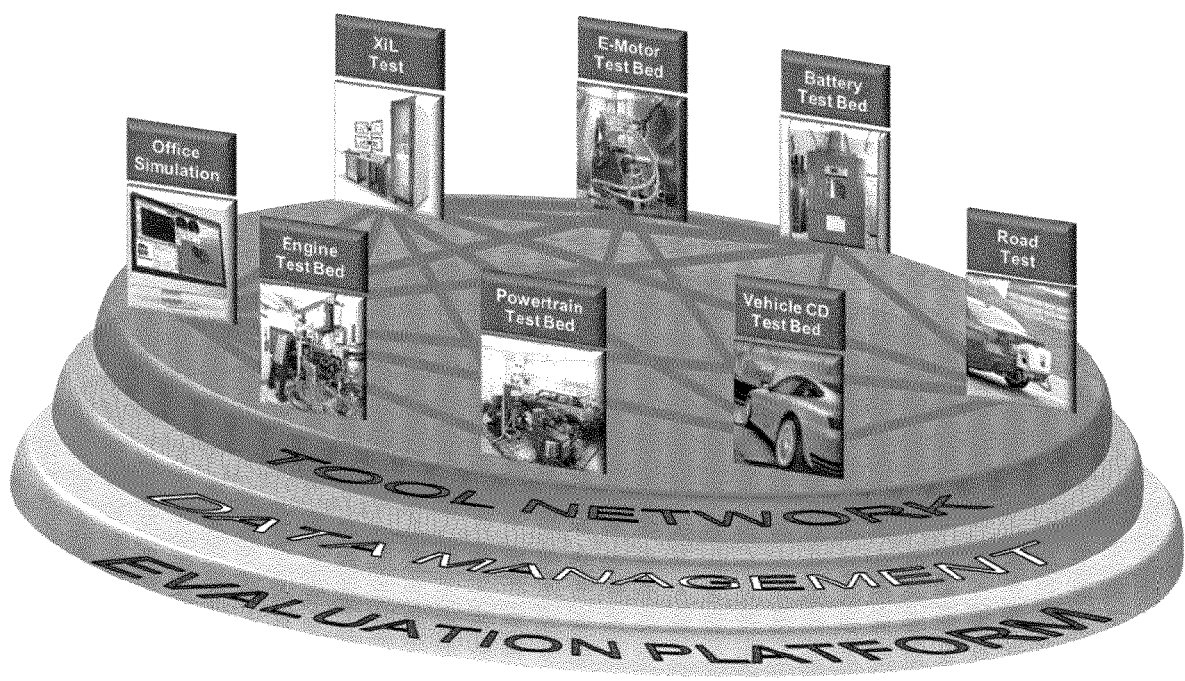
Figure 18:
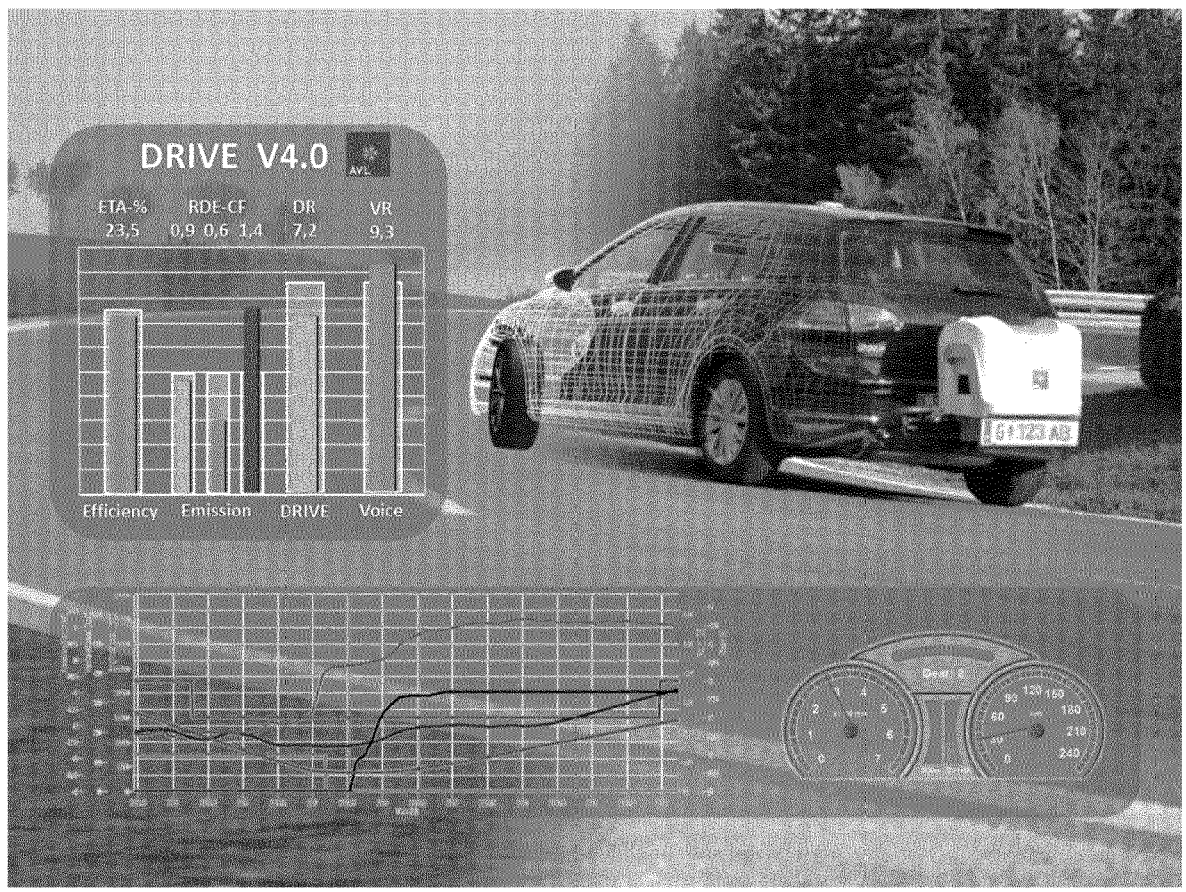
Figure 19:
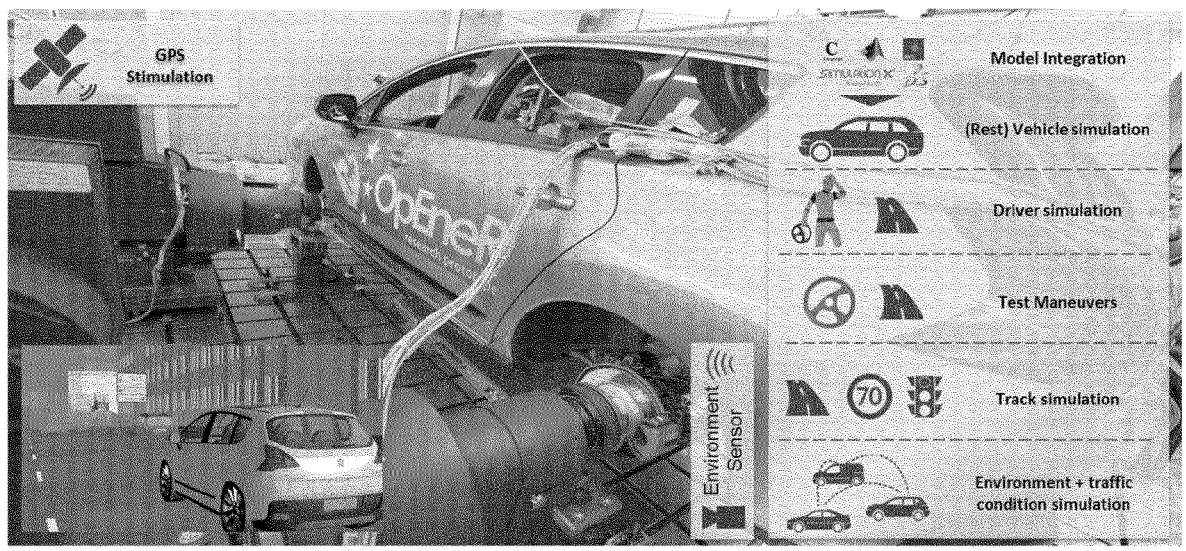

Exemplary embodiments of the method and/or apparatus as well as further advantages will follow from the description below in conjunction with the figures which in detail show:

FIG. 1 a partly schematic depiction of a first embodiment of the inventive system in use in a vehicle having an internal combustion engine;

FIG. 2 a partly schematic depiction of a second embodiment of the inventive system in use in a vehicle having a parallel hybrid drive;

FIG. 3 a partly schematic depiction of a third embodiment of the inventive system in use in a vehicle having a combined hybrid drive;

FIG. 4 a partly schematic depiction of a block diagram of a method according to the invention;

FIG. 5 a partly schematic depiction of a diagram of the nitrogen oxide emission of an internal combustion engine as a function of time;

FIG. 6 a partly schematic depiction of a diagram based on FIG. 5 adjusted by a signal propagation delay and/or exhaust period;

FIG. 7 a partly schematic depiction of a diagram of the carbon dioxide emission as a function of driving states for different vehicle types.

FIGS. 8 to 19 relate to further aspects of the invention.

FIG. 1 shows a first embodiment of the system according to the invention within a vehicle 1 having an internal combustion engine 2. In the vehicle 1, energy which is carried along in the form of fuel in a fuel reservoir 13 is converted by a combustion engine 2 into mechanical energy and transmitted via a transmission 14 and differential 16 to the wheels 15 of the vehicle 1. A part of the mechanical energy of the combustion engine 2 is diverted as electrical energy to an auxiliary equipment unit 8 directly or with a conversion step by a generator. Auxiliary equipment is hereby in particular an air conditioning system or fan, for example, but also servomotors, e.g. for the window lifts; i.e. any assembly which consumes energy not used in generating the drive of the vehicle 1. Exhaust and/or emissions are discharged to the environment through the exhaust system 18 by means of an exhaust gas treatment apparatus 9, e.g. a catalytic converter or a particulate filter.

In order to give consumers a point of reference with respect to energy efficiency, the regulation on identifying passenger car CO2 emissions has been in force in the Federal Republic of Germany since Dec. 1, 2011. Since then, any vehicle on display or offered for sale or lease must display the associated CO2 label identifying its energy efficiency class. For vehicles, this classification is based on the vehicle's weight. There is thereby a direct connection between a vehicle's energy efficiency and its emissions.

Emissions are also subject to ever stricter legal regulations. The European Community's first uniform emission standards came into force in 1970. At that time, only carbon monoxide and hydrocarbon emissions were limited. Nitrogen oxide was introduced as an additionally restricted exhaust emission in 1977. Limit values on particulate matter (soot) from diesel engines were introduced in 1988. Europewide limit values on exhaust emissions for commercial vehicles and buses were first established in 1988. Europewide exhaust limits have been in place for motorcycles and mopeds since 1997.

Exhaust regulations have gradually intensified ever since. The strictness here pertains to the type and amount of emission values and the continuing compliance with same.

Emission values are tested to the regulatory standards in a standardized driving cycle. This currently lasts for a total of 1180 seconds (just under 20 minutes). It consists of an Urban cycle (urban conditions) lasting for 780 seconds and an Extra-urban cycle (inter-urban conditions) lasting for 400 seconds. The ambient temperature during measuring is 20° C. to 30° C. Cold-start conditions, acceleration and lag are determined and interpolated accordingly.

The evaluation of the emissions on the basis of the standardized driving cycle is particularly problematic since it represents an averaged profile to enable the comparison of different vehicles. These driving cycles often do not correspond to customer usage profiles, particularly when a customer regularly drives short distances and in city traffic. The process also does not measure, and thus does not incorporate into the average calculation, consumption or emissions at speeds greater than 120 km/h. A further disadvantage of emission evaluation during a driving cycle lies in the search for causes of increased emissions being aimed solely at an optimization of the entire cycle. No evaluations are made of emissions during individual driving states, sequences of driving states or even operating states of the vehicle.

In order to classify vehicles into energy efficiency classes, the reference value for the CO2 emission is determined, at the time of application, based on the vehicle weight. In contrast, information on how much of the energy that goes into effecting the forward movement of a vehicle is used efficiently and how much the fuel processing apparatus, particularly a combustion engine and/or fuel cell, or other influencing factors contribute to the energy efficiency cannot be deduced from the classification into an energy efficiency class.

In this light, the inventive system preferably has the objective of determining emissions of the vehicle 1 and drawing conclusions therefrom as to the emission behavior of the vehicle 1 in different driving states and/or as to the energy efficiency; i.e. the expenditure of energy needed to achieve the operation of the vehicle 1.

To this end, the system preferably comprises an exhaust analysis device 12 arranged at a point in the path of the exhaust system 18 of the vehicle 1 and analyzes emissions of the internal combustion engine 2. Preferably, this exhaust analysis device 12 comprises at least one second sensor 4 able to identify at least one component of the emissions. The inventive system preferably further comprises a plurality of first sensors 3a, 3b, 3c, 3d, 3e, 3f serving to characterize a vehicle operating state of the vehicle 1. The vehicle state preferably contains at least one item of information on a driving state of the vehicle 1. Driving states of the vehicle 1 are hereby, for example, idling, pulling out, acceleration, tip-in, tip-out, deceleration, gear shifting, rolling at constant speed, engine start, engine shut off, etc.

Additionally to the driving state, the plurality of first sensors 3a, 3b, 3c, 3d, 3e, 3f preferably further provide at least one further item of information, e.g. on the operating state of at least one auxiliary equipment unit 8, for example the air conditioning system, the momentary power draw of which is preferably determined by a current sensor 3d. Further possible auxiliary equipment 8 are, for example, a fan, servomotors for the steering or also the window lifts, electrical heaters, fuel processing means, etc.

Preferably, the system additionally or alternatively comprises further sensors 3a, 3b, 3c, 3d, 3e, 3f which monitor the operating state of other apparatus of the vehicle 1, control information, or even the energy flow in the vehicle 1. Thus, a flow sensor 3a preferably measures how much fuel the fuel reservoir 13 supplies to the combustion engine 2 as a function of time. A further sensor 3c preferably measures the output provided by the combustion engine 2 or the work it performs respectively. A further sensor 3b preferably measures the combustion engine 2 settings, e.g. the set valve lift or ignition timing. A further sensor 3e preferably measures a state of the apparatus for the exhaust gas treatment 9. Further sensors can be provided in order to determine for example the state of the transmission 14, e.g. the engaged gear or even the skid of the wheels 15 or power distribution in the differential 16. Preferably, at least one further sensor 3f monitors the power or energy flow in or out of a charge storage device 11.

The system preferably further comprises a control device 5 which is preferably designed to control and monitor the measuring performed by the plurality of first sensors 3a, 3b, 3c, 3d, 3e, 3f, 3g and the at least one second sensor 4. The control device 5 is preferably designed to repeat measurements with the plurality of first sensors and the at least one second sensor for a predefined period of time and to compare a data set of the measurement with the plurality of first sensors to predefined parameter ranges characterizing at least one predefined driving state. The system preferably moreover comprises an allocation device 6 which is designed to allocate measured values of a second data set with measured values of the at least second sensor 4 to the at least one driving state. Lastly, the system preferably comprises an evaluation device 7 designed to determine at least one characteristic value for the evaluation and/or optimization of the operating behavior of the vehicle 1 on the basis of the at least one driving state of the second data set, whereby the characteristic value is preferably suitable for characterizing an energy efficiency and/or an emission behavior of the vehicle 1, particularly the combustion engine 2.

The control device 5, the allocation device 6 and/or the evaluation device 7 are preferably realized as electronic apparatus. The devices can however preferably also be designed as modules of a single device, for example an electronic unit 19 or, particularly preferentially, even purely as software modules of a control unit of the vehicle 1.

As depicted in FIG. 1, the individual first sensors 3a, 3b, 3c, 3d, 3e, 3f, 3g and second sensor 4 are connected to the control device 5, the allocation device 6 and/or the evaluation device 7 or electronic unit 19 respectively for signal transmission. This connection can be realized as both wired or wireless, whereby use is preferably made of the existing on-board network of the vehicle 1.

Preferably, the system, in particular the electronic unit 19, comprises a storage so that the control device 5 can preferably record and store measured values of the plurality of first sensors 3a, 3b, 3c, 3d, 3e, 3f, 3g and/or the at least one sensor 4 over a longer period of time. The characteristic value determined by the evaluation unit can be determined on the basis of the stored measured values over many vehicle states or over a longer period of time respectively. The apparatus for exhaust treatment 9 is in particular a particulate filter or a catalytic converter, although any other apparatus for exhaust treatment can hereby also be employed. Further sensors are, for example, a thermometer for determining ambient temperature or MEMS (microelectromechanical systems) able to determine a roadway slope or also various acceleration values at different points in the vehicle 1.

The system according to the invention is preferably used in a vehicle 1, particularly in a passenger car or a heavy goods vehicle. In principle, however, the inventive system is not limited to road vehicles but can in fact also be used correspondingly in aircraft or watercraft.

FIG. 2 shows the use of the inventive system in a vehicle 1 having parallel hybrid drive. The vehicle 1 basically differs from the vehicle 1 in FIG. 1 by the fact that additionally or alternatively to the mechanical energy of an internal combustion engine 2, the mechanical energy of an electric motor 10 can be supplied to the transmission 14, the electric energy needed thereto drawn by same from a charge storage device 11. It is in principle also possible for the apparatus 10 to not be an electric motor but rather a rotary piston engine which processes or generates compressed air and the storage 11 to be a compressed air reservoir.

In the use in the hybrid vehicle 1 of FIG. 2, the inventive system differs from the vehicle 1 with conventional drive from FIG. 1 in particular by the fact of there being additional sensors monitoring the function of the charge storage device 11 and/or the electric motor 10 and the energy flow between these two apparatus and the transmission 14. In the process, parameter values are preferably determined with the plurality of first sensors $3a$, $3b$, $3c$, $3d$, $3e$ or further sensors $3f$ and $3g$ respectively which in particular characterize the state of charge of the charge storage device 11 and the operating state of the electric motor 10. The characteristic value for the evaluation and/or optimization of the operating behavior of the vehicle 1 can then be determined on the basis of these parameter values, whereby preferably also the operation strategy of the electric motor 10 and the charge storage device 11 is thereby factored in.

FIG. 3 depicts an example use of the inventive system in a vehicle 1 having a combined hybrid drive. In contrast to a parallel hybrid, in the vehicle 1 of FIG. 3, the vehicle can be solely operated by means of the electric motor, whereby the internal combustion engine 2 serves solely in this case to produce electrical energy by way of a generator 17. Preferably, the internal combustion engine 2 can hereby be configured as a so-called range extender. The auxiliary equipment 8 can thereby be supplied with electrical energy solely from the charge storage device 11. In contrast to FIGS. 1 and 2, the inventive system here preferably comprises additional sensors $3f$ able to analyze the energy flow between the generator 17, electric motor 10 and the charge storage device 11.

The example embodiments of FIGS. 2 and 3 show that the inventive system is not only suited to evaluating and/or optimizing the operating behavior of a vehicle 1 having an internal combustion engine 2 but also for other types of vehicles implementing alternative drive concepts. Use of the inventive system is also feasible in vehicles not having an internal combustion engine 2 as a fuel processing apparatus but instead for example a fuel cell and in which the electric energy produced by same and/or the waste heat is used to drive the vehicle 1 and/or reform any fuel into a gas mixture suitable for operating the fuel cell.

FIG. 4 shows a block diagram of the inventive method. The procedural steps of the advantageous embodiments are hereby depicted in the dotted line-edged blocks.

In one procedural step 101 of the method 100, a first data set with measured values of a first group of parameters suitable for characterizing the vehicle state of the vehicle 1 is acquired. Preferably, these parameters are measured by the first sensors $3a$, $3b$, $3c$, $3d$, $3e$, $3f$, $3g$. Preferably, the vehicle state is thereby composed of a parameter which characterizes a driving state of the vehicle 1 and at least one further parameter which characterizes one of the following properties: an operating state of at least one auxiliary equipment unit 8, an operating state of at least one apparatus for exhaust treatment 9, an ambient temperature, a roadway slope, a position of the vehicle 1 and an operating state of the apparatus for fuel processing 2.

In a further procedural step 102, a second data set with measured values of at least one parameter of a second group of parameters suitable for characterizing the emission of the vehicle 1 is preferably determined. Here, gas components of the exhaust gas of an internal combustion engine 2 are preferably analyzed with suitable sensors 4, particularly identified are the component parts of carbon monoxide, hydrocarbons and nitrogen oxides, particulate matter, particle counts, non-methanol hydrocarbons and/or particle mass of the particulate matter.

In a further procedural step 103, the two above-cited procedural steps are repeated for a predefined length of time. This specified period can be defined by the presence of multiple vehicle states, particularly multiple driving states, during the measurement period. However, a short period can also be selected for the predefined length of time such that only one single vehicle state, particularly one single driving state, is considered. It is further conceivable for the predefined period to relate to a specific road segment, e.g. only on a highway, as well as also an entire route or trip.

In a further procedural step 104, the vehicle state is identified on the basis of the measured values which are suited to characterizing a vehicle state by the measured values of the parameters suitable for characterizing the vehicle state being compared to predefined parameter ranges or by the vehicle states being determined by a function in which the measured values input as variables.

In a further procedural step 105, the measured values of the emission are preferably allocated to that vehicle state which was present at the time of the measurements by the exhaust analysis devices. Given preference for the allocation, however, is a signal propagation time or a calculation time of the inventive system. Given further preference for the allocation is the elapsed exhaust time from formation in the internal combustion engine 2 until the measurement by a sensor 4, particularly with the exhaust analysis device 12.

Preferably, the energy consumed by the vehicle 1 is additionally determined in a procedural step 106 on the basis of the measured values of the parameter characterizing the emission of the vehicle.

The determination of consumed energy is thereby based preferably on the volume of carbon dioxide present in the exhaust and, as the case may be, the carbon monoxide in relation to carbon dioxide, carbon monoxide as applicable, introduced into the internal combustion engine 2 from the ambient air.

Furthermore, the energy of the internal combustion engine supplied for the drive, particularly the mechanical work, is preferably determined in a further procedural step 107. For this purpose, the measured values of the first data set are likewise evaluated, particularly the measured values of sensors $3a$, $3b$, $3c$, $3d$, $3e$, $3f$, $3g$ indicative of the operating state of the internal combustion engine 2. The ratio of supplied energy to consumed energy can be calculated for the determined at least one calorific value for the evaluation and/or optimization of the operating behavior of the vehicle based on the values for the consumed energy and the provided energy in procedural step 109. This ratio is a measure of the efficiency with which the vehicle 1 is driven. This ratio can further indicate the total efficiency of the vehicle 1 if the operation of all the auxiliary equipment 8 subject to specification of boundary conditions, e.g. the temperature to be maintained in the vehicle, is to be incorporated.

Different operation strategies can be tested by calculating the energy efficiency. The objective thereby is determining optimum operation strategies in regards to the energy efficiency.

If the vehicle 1 additionally comprises an electric motor 10, the characteristic value is preferably further determined by the inventive method on the basis of the state of charge of the electric motor 10 and/or charge storage device 11. Here, at least one parameter which characterizes a driving state of the vehicle 1 and/or one parameter which characterizes the state of charge of the charge storage device 11 is evaluated. A parameter characterizing an operating state of the electric motor is preferably further incorporated into the characteristic value. How well the electric motor 10 is used to prevent emissions or to increase the energy efficiency of the vehicle 1 can be determined on the basis of this parameter specifying the electric drive of the vehicle 1. The flow of energy flowing in the vehicle 1 hereby plays an important role. Thus, for example, at no point during travel should the charge storage device 11 be fully charged so that energy generated by recuperation can be buffered when need be.

FIG. 5 represents a diagram which results from the procedural steps S1 101, S2 102, S3 103 and S4 104 of the inventive method being executed during a period of time in which a vehicle 1 is running through a plurality of different vehicle states, particularly driving states. In the example embodiment depicted, the amount of nitrogen oxides is determined to be a relevant emission of the vehicle. In this form, however, the diagram is meaningless. As the diagram namely shows, an emission peak of nitrogen oxides occurs when idling. The diagram neither takes into consideration the elapsed exhaust time from formation to reaching the apparatus for exhaust treatment 9 nor any possible signal propagation time and/or subsequent evaluation calculation period in an electronic unit 19.

FIG. 6 shows the accordingly adjusted diagram with the correct allocation as can be achieved in a further procedural step 108 of the inventive method. In order to determine the elapsed exhaust time from formation to the apparatus for exhaust treatment 9 or to the corresponding second sensor 4 respectively, an additive can be added into the combustion of the engine which can likewise be detected in the apparatus for exhaust treatment 9 so that the elapsed exhaust time can be measured. Alternatively or additionally thereto, the entire volume of gas flowing through the engine can be calculated and the length of time for the gas to travel to the exhaust analysis device 12 calculated using the dimensions of the exhaust system 18.

The $CO_2$ emission in mass per distance covered for various driving states is shown on the right side of FIG. 7, whereby four different types of motor vehicles are plotted. The depiction on the right side of the diagram therefore corresponds to the allocation of the second data set to the predefined driving states made in step S5 105. A total collective evaluation has been determined, 109, from the individual values for the respective driving states on the right side of the diagram. This total evaluation is preferably a characteristic value for the evaluation and/or optimization of the operating behavior of the vehicle 1. Preferably, a weighting vector is thereby used.

A weighting vector is a vector by which momentary emission values can be weighted.

For example, with the emission parameters A, B, C, D and a (1; 1; 1; 1) weighting vector, the values carry over to the further calculations unchanged.

However, with a (1, 2; 1; 0, 9; 1) weighting factor, for example, the value is then increased by 20% and the third value decreased by 10%. Hence, the measurement can be easily adapted to the requirements of a conditional operating state or a specific target variable for an optimization.

The inventive coupling to a weighting vector can however also ensue via addition; in this case, specific correction values are added to or subtracted from the measured values prior to the emission characteristic value being calculated.

In accordance with the invention, a plurality of weighting vectors can be used. In particular, a portion of the parameters can be linked to a first weighting vector by multiplication while a second group of parameters is linked to a second weighting vector additively.

Further preferably, the characteristic value is determined on the basis of a plurality of measured values for individual operating states, whereby a geometric or arithmetical averaging is in particular undertaken.

Further aspects of the invention are described in the following example embodiments which in particular reference FIGS. 8 to 19.

Tightened legal requirements (e.g. CO2, WLTP, RDE) and increased customer requirements ("positive driving experience") as well as the inclusion of all the relevant environmental information ("connected powertrain") result in drastically increased complexity and increasing variation diversity for future drive systems. The development challenges are thereby even further intensified by shortened model life cycles and the additional increased inclusion of actual customer driving ("real-world driving").

Efficient development under expanded "real world" boundary conditions such as for example the expanding of the previous synthesized test cycles to real operation with random driving cycles firstly requires objectifying subjective variables (e.g. driving experience) but also reproducibly determining complex, stochastically influenced characteristic values (e.g. real-drive emissions). To this end, random driving profiles are divided into small, reproducible and assessable driving elements and the relevant trade-off relationships (e.g. driveability, noise perception, efficiency, emission) optimized in the single element. An intelligent "event finder" thereby allows selectively concentrating on those driving elements which have substantial influence on the total result. Additionally, a "real-drive maneuver library" generated therefrom coupled with a comprehensive complete vehicle model forms an essential foundation for positioning individual development tasks in the respectively best-suited developmental environments and thus increasingly in the virtual world.

However, a shortening of the overall total vehicle development process requires not only intensified front-loading during the development of the individual subsystems but also heightened all-encompassing activity in mixed virtual/real developmental environments. The step from digital mockup (DMU) to functional mockup (FMU) and consistent evaluation from the entire vehicle perspective contribute substantially to even being able to control the complexity of future drives within short development times in the first place. With the integrated open development platform IOPD and the expanded evaluation platform AVL-DRIVE V4.0, AVL has hereby created substantial tool and methodology modules.

1. Challenges in Drive Development

The greatest stimuli for advancing passenger car drive systems over the medium and long term will come both from legislation as well as from the end customer.

The significant reduction of CO2 fleet emissions under the threat of penalty fines, stricter test procedures (WLTP) and the additional limiting of harmful emissions in real customer vehicle operation (real driving emission) represent significant tightening of the legal statutory constraints and create substantial additional expenditures for the vehicle development process. On the customer's side, the matter of "Total Cost of Ownership" on the one hand is taking on importance while on the other hand, purely subjective criteria like social trends and social acceptance, etc., but also particularly a "positive driving experience" are having increasing influence on the most critical of purchase factors. Thus, the focus of the representation is expanded from purely technical objective values such as performance and fuel consumption to the satisfying of a positive subjective customer experience the "experience car" thereby goes far beyond the powertrain performance. The consumers thereby perceive the properties and value of the vehicle such as its styling, ergonomics, operability, infotainment and assistance systems, sense of safety, driving comfort, agility and driveability in a holistic context as the overall vehicle performance.

Thus, actual real-world driving has become particularly important in the development of new vehicle systems: not only real-world emissions and consumption but also the positive driving experience of the customer is a crucial objective criterion. Subjective valuation criteria are, however, subject to more than just rapid changes. New trends, individual requirements and new technologies yield significant unpredictability in a highly dynamic market [1]. The response to this situation can only be extremely rapid reactivity in product configuration and development. The short model cycles already common throughout the IT field today on an order of just months are having increased impact on the infotainment and assistance systems in automobile development. Thus, we in the automotive field also must adapt to substantially shortened model change cycles and/or upgradable solutions as well as introduce flexible development methods. A sensible technical solution here certainly lies in expanded modular design principles which enable highly diversified solutions by means of software. Flexible, adaptive and test-based methods of model-based development will thereby be of assistance.

With respect to the purely technical aspects, certainly CO2 legislation represents the most significant technology driver. Future CO2 and/or consumption fleet limits are converging worldwide into continually reducing levels. This requires on the one hand complex drive systems with ultra-flexible components, on the other, however, also calls for increased individualized adapting to the most diverse boundary conditions and results in multi-dimensional diversification of drive systems (different energy sources, different degrees of electrification, variant diversity, etc.).

In the future, integration of the powertrain into the entire relevant vehicle environment ("connected powertrain") will additionally allow optimum adapting of operating strategies to actual traffic and environmental conditions. The wealth of information from vehicle infotainment and assistance systems to C2X communication allows the precalculating of numerous scenarios and thus tremendously expands the optimization horizon. The various degrees of freedom of future drive systems can thus be used to a substantially greater extent to reduce energy consumption. However, this requires highly complex operating strategies with drastically increased development, calibration and above all validation expenditure.

In addition to the reliable control of such increasing drive system complexity, future RDE legislation represents a further, very crucial influence on development methodology. This is characterized by the expansion of the synthesized test cycle to randomized actual operation with a bewildering range of different driving states and boundary conditions.

From the customer's perspective, however, real-world driving encompasses substantially more than just RDE:
Positive driving experience—Driveability/Comfort/Agility/Operability
Absolute functional safety
Highest efficiency/minimum consumption
Confidence in driver assistance systems
High reliability/durability 2. Driving Element-Oriented Approach in the Development Process The transition from precise testing reproducibility with clearly defined cycles and fixed evaluation variables to real-world driving evaluations with statistical randomness as well as consideration of subjectively perceived driving experiences represents a substantial upheaval and thereby necessitates both new developmental approaches as well as new development environments. The substantial fundamental requirements thereby are:

The objectification of subjective variables (e.g. driving experience): In terms of the objectification of subjectively perceived noise and driveability, AVL has been gathering practical experience for many decades and developing the corresponding developmental tools thus, for example AVL-DRIVE [2] is well on its way to becoming a widely accepted tool for evaluating driveability.

Reliably reproducible determination of complex stochastically influenced characteristic values (e.g. real-drive emission): Subdividing such complex driving profiles into reproducible and assessable segments—the driving elements categorizing them and statistically factoring in the influence on the integral characteristic value is a highly practicable approach. This can be seen analogously to the discretization of other task definitions such as e.g. fatigue analyses or process simulation. The value of these elements is thereby dictated by the demand for reproducible evaluability. Subjective human perceptions hereby also become the reference for other evaluation parameters such as consumption, emissions, etc.

However, the truly crucial step is the ability to identify those single elements from the plurality of single elements which have significant relevance for the overall result.

AVL has successfully used such a method for years within the realm of driveability development (AVL-DRIVE). A random real-world driving profile is thereby divided into defined single elements which are then allocated to approximately 100 individual categories and separately evaluated and statistically assessed according to approximately 400 specific evaluation criteria.

With comparably few adjustments, this method of using categorizable driving segments can be employed not only for evaluating driveability and noise level under actual conditions, but also for emissions, efficiency and subsequently also lateral dynamic variables all the way up to the evaluation of driving assistance systems [3].

In assessing the results of real-world measurements, it becomes evident that while there are single driving elements which are relevant to the overall evaluation only in terms of one optimization variable, as a general rule, the same driving elements are material to emission, efficiency, driveability and noise level. The conflicting objectives within a single driving element must then be resolved by means of these interdependences.

An intelligent "event finder" can thereby reliably identify "bottlenecks." Identification of these "events"—thus of result-relevant driving elements—requires online specification of corresponding target values for these driving elements and comparison to the actual values measured in each case. The target values for the individual evaluation variables are thereby generated in different ways:

Efficiency: The online target value calculation is realized in a complete vehicle model synchronized to the vehicle measurements based on the measured vehicle lateral dynamics and a factoring in of the current topography as well as other driving resistances. The vehicle model not only contains the entire hardware configuration but also the corresponding operating strategies. A balancing of all energy flows and energy stores is of course thereby necessary.

Emissions: In principle, the target value specification could be realized analogously to the "Efficiency" evaluation variable. With respect to the forthcoming RDE legislation, however, it makes more sense to effect the evaluation pursuant to the RDE regulations to be stipulated in the future legislation.

Driveability: Target value specification here is realized on the basis of objectified subjective driving perceptions and the specifying of a desired vehicle characteristic pursuant to AVL-DRIVE-developed classifications [2]. To objectify subjective driving perceptions, human perceptions via neural networks thereby need to be repeatedly correlated with physically measurable variables.

NVH: Similarly to the driveability, target value specification here is effected on the basis of the objectified subjective perception of noise and specification of the desired acoustic characteristics (e.g. AVL-VOICE [4]).

For evaluating the level of development of a vehicle, however, of interest is not only a comparison to the typically generated ideal values and processes in the concept phase of overall development but also the positioning within a specific benchmark distribution range. This is particularly of significance for vehicle analyses in which the basic data necessary for target value calculation is not complete. So as to ensure sufficient statistical relevance of current benchmark data (real-drive maneuver library), AVL conducted, e.g. just in 2014 alone, approximately 150 benchmark tests on the respectively most current vehicles.

The actual optimization results from incorporating the single result-relevant events into the respectively best-suited development environment. For single events primarily relating to only one evaluation variable, the optimization takes place in many cases directly in the vehicle in direct interaction with an automated online evaluation (e.g. compensating specific driveability failings).

For those single events in which there are pronounced conflicting objective relationships between the different evaluation variables (e.g. efficiency, emissions, driveability, etc.), it is expedient to reproduce the relevant single events on the XiL, motor and/or powertrain test bed. The reproducible operation here allows efficient single driving element development, whereby there is not only an isolated optimization of a single variable but rather an optimizing of the trade-offs (typically emission/efficiency/driveability/noise). In addition, given a concurrently running complete vehicle model, the effects on the entire "vehicle" system can also be directly assessed. Moreover, the comparison to a "real-drive maneuver library" (benchmark data) allows detailed classification in the competitive environment. This direct assessability enables a fast and accurate response and thus a greater degree of process flexibility.

The driving element consideration based on an intelligent event finder allows both efficient calibration capability as well as also an accurate virtual identification of optimally adapted drive architectures. This also enables the generating of a refined developmental topography map in which the relevant developmental tasks (both technical as well as subjective variables) are marked.

The availability of a comprehensive maneuver database with corresponding statistics on result-relevant single events as well as a segmented consideration of relevant driving profiles is thus essential not only in the calibration process but also during the early conceptual phase of powertrain development to accurately address important result-relevant task definitions.

3. Simultaneous Control of Developmental Procedures on Multiple Development Levels In addition to segmenting complex driving profiles into small, assessable single elements (vertical segmenting), categorizing the system integration of the complete vehicle into different system and component levels (horizontal categorization) is also a reliable basis for efficient development processes.

The vehicle-internal data and regulatory network/environment integration ("connected powertrain") results in an additional superordinate system level, the "traffic level."

The segmenting of driving profiles originally began at the vehicle module level with the optimizing of the longitudinal dynamics behavior of the powertrain (driveability optimization) and was then broken down to the level of the individual powertrain modules (e.g. engine, transmission, etc.).

However, a comprehensive acoustic and comfort evaluation already requires segmenting to the vehicle level. Operating at the vehicle level is also necessary in the development of the lateral dynamics-relevant functions (such as e.g. chassis tuning through to stability control [5]).

For the objectified evaluation of driver assistance systems (ADAS—Advanced Driver Assistance Systems), all the relevant environmental information needs to be integrated and thus the highest system level ("traffic level") included.

Basically similar requirements with respect to the segmenting of complex driving profiles and the objectification of subjective variables are also applicable to most optimizations on the vehicle or traffic level. The tools already employed in the evaluation of the powertrain longitudinal dynamics can thereby also be used for the optimization of lateral dynamics functions [2]. Since, however, the segmentation of the driving profiles differ for longitudinal and lateral dynamic aspects (with the exception of the stability control), there are few trade-off relationships, a further separate treatment of longitudinal and lateral dynamic tasks with respect to controllable developmental complexity seems to be expedient at present. In contrast, there are already comprehensively optimized longitudinal and lateral dynamic task definitions in motorsport racing today.

Although the essential subsystems at the vehicle module level (e.g. powertrain, body and chassis, electrics and electronics) are developed alongside their own processes, the overall vehicle development process is the dominant reference variable for all the other system developments. The overall vehicle development thus synchronizes all individual developmental tasks and also controls the structure of software and hardware integration levels (concept and prototype vehicles) with predefined functions. Complicating matters, however, is the fact that the developmental processes of the individual subsystems generally adhere to different time frames.

Hence, the common synchronization points within the overall vehicle development process (integration levels 1 to X) not only require working on a solely virtual or a solely real basis but also increasingly in mixed virtual/real development environments.

A key to controlling the complexity of the drive concepts of today and of the future is the early functional integration of the subsystems into an overall complete system perhaps provided in its entirety, partially or even only virtually. Today's well-established, purely actual integration level process (with actual hardware and software) will also be expanded in the future in line with front-loading to earlier development phases in purely virtual and combined virtual/real development environments.

Developments at the module or component level can thus then also be analyzed and developed in a total-vehicle context in the absence of complete vehicle prototypes. Complex interrelationships can thereby be evaluated and controlled in purely virtual or combined virtual/real developmental environments at an early stage and thereby facilitate the transition from digital mockup (DMU) to functional mockup (FMU).

Although the final validation of the functions will continue to occur in the vehicle, increased front-loading will also thereby be employed. With the new possibilities of a combined virtual/real development process, the steep rise in the number of development subtasks cannot only be efficiently managed but already initiated in the earlier development phases. Only by so doing will the complexity of drive development even be able to be controlled at all in the future.

Hence, over the entire development process, it is necessary to have an evaluation from the perspective of the overall vehicle subject to the relevant operating conditions (driver+road+environment). Virtual and real-world testing is therefore coupled by way of a parallel complete vehicle model.

Both the functional development as well as also the validation of the combustion engine are run on stationary and dynamic engine test beds. The development of engine control and corresponding software functionalities including diagnostic functions is most appropriately transferred to XiL test rigs. The parallel virtual complete vehicle model (entire vehicle) with driving resistances, structure, axles, suspension, steering, braking system allows a continuous evaluation for achieving objectives in terms of vehicle consumption, emission and dynamics.

Particularly for the tuning, calibrating and validating of hybrid functions, the provision of combustion engine, transmission and electric motor hardware on the powertrain test bed constitutes a most efficient development environment. On the other hand, all the development tasks not requiring the full powertrain hardware (e.g. development/calibration of diagnostic functions) are processed in parallel in an XiL environment.

Depending on the task definition and available vehicle hardware, testing is run on the powertrain test bed with or without vehicle, on the rolling test rig as well as on the road in assembly carriers or in the vehicle prototype respectively. Since test conditions (driver, distance, load, wind, altitude, climate, etc.) as well as the parameters of the complete vehicle (driving resistances, structure, axles, suspension, steering, etc.—variant simulations) can change relatively rapidly on the powertrain test bed, it is often advantageous to increase both the development as well as the validation of complex systems (e.g. a completely new hybrid system) on the powertrain test bed even when the entire hardware including vehicle is available.

The allocating of tasks to the respectively best-suited development environment is gaining great important particularly in the field of validation. The combination of dramatically increasing system complexity and shortened development times requires intensified front-loading not only for the functional development but in particular also for the functional validation. Complete system validation is thereby no longer exclusively hardware-based but rather occurs in widely diverse combinations of real and virtual components in mixed virtual/real development environments (e.g. "virtual road on the test bed—virtual route—virtual driver").

An efficient and comprehensive validating of functional safety is crucial in the case of complex systems. The basis for the validation thereby represents a precisely generated collective of relevant test sequences which must provide feasible operational and misuse scenarios as well as comprehensive FMEAs (Failure Mode and Effects Analysis) by means of detailed system analysis, evaluation and classification. A high degree of systematization and automation thereby enables potentially critical operating states to be tested in substantially shorter time than of conventional road tests.

Pre-selecting these potentially critical states of course entails the risk of the test program only providing answers to explicitly posed questions while not addressing other points of risk. This risk will be lessened in the future by additional validating profiles generated from the maneuver database.

4. From DMU (Digital Mock-Up) to FMU (Functional Mock-Up) or from the "ToolChain" for the Traditional Development Procedure to the "ToolNetwork" for an Integral, Multi-Level Development Process In the actual development process, the parallelism of virtual, numerical component models and actually available hardware development stages already today require in many cases a "leap" between virtual and "real" experiments and will to a much greater degree in the future, whereby the "real" experiments of today in many cases already contain simulations. For flexible development, simulation and hardware have to mesh seamlessly and be interchangeable. In many cases, the development tool consistency required for that is not yet in place. The AVL-IODP (Integrated Open Development Platform) consistently displays this consistency throughout the entire development environment.

Substantial aspects of the systematic application of an integrated consistent development platform, which is moreover open to the most varied tools, are:

Consistent processes and methods allow a "front loading" of development tasks which to date have largely been performed for example in road tests, in earlier development phases, on the motor or powertrain test bed in extreme cases, even in a purely virtual simulation environment (office simulation). Thus, an engine can for example be precalibrated in a combined real/virtual development environment with comparable quality of results substantially more rapidly than just by road testing alone.

Simulation model consistency: Situation models prepared in early development phases can also be reused in subsequent development phases and environments. These simulation models supplement (as virtual components) the hardware/development environments (i.e.

test beds) by a mixed virtual/real development environment able to represent interactions at the complete vehicle level.

Consistent comparability of virtual and real tests by means of consistent data management and seamless model and method consistency. Results generated by means of simulation must on the one hand be consistent with the corresponding real-world tests and, on the other, also allow further development of the simulation models on the basis of the test results over the course of the development process. The feasibility of such continuous, consistent reconciliation between the virtual, real and combined virtual/real world is the prerequisite for a flexible modern development process.

Consistent model and test parameterization: Particularly during controller calibration, a plurality of input parameters such as e.g. environmental conditions, driving maneuvers, calibration data sets, etc. need to be managed. In order to be able to later compare the results between virtual and real testing, the input data sets also need to be comparably and consistently provided in the process.

Consistent embedding into existing process environments: It is of course necessary to be able to integrate continually new and/or improved development tools into existing processes and process environments. Such a development platform must therefore be open in the sense of, on the one hand, the integration of virtual, real and combined virtual/real tools and, on the other, the data management. The preferential aim is a "bottom-up approach" which also allows the integration of existing tools, thereby building upon existing know-how and well-established tools.

This IODP development platform is thus the basis for a consistent, model-based development process and broadens conventional toolchains into an integrated and consistent network: "From a sequential toolchain to a tool network." In this platform, virtual and real drive components can be integrated at the complete vehicle level at any time in the development process and the respectively suitable development environments configured. This tool network thus also represents a tool kit for the most flexible development process possible.

Consequently, integrating the development tools also requires an integrated evaluation platform in which the development result can be evaluated not only at the component and system level but also at the complete vehicle level on an ongoing basis.

Driveability evaluation with AVL-DRIVE has represented a first approach toward a comprehensive evaluation platform for many years now. The structure of this evaluation platform allows a consistent driveability evaluation to be conducted with all the relevant tools—from office simulation to real-world vehicle road test. The next expansion stages of AVL DRIVE-V 4.0 expand this evaluation platform by Emission evaluation pursuant to RDE legislative guidelines Efficiency evaluation with online ideal target value calculation including benchmark environment positioning Subjective noise perception evaluation This thus renders possible a consistent evaluation of the most essential evaluation parameters, from simulation to a motor/drive test bed and roller rig to the road test.

5. Outlook

The systematic continuation of these model-based development methods with driving element-based evaluation will in the future also enable selective development of Advanced Driver Assistance Systems (ADAS), automated driving as well as the "connected powertrain" in a "connected vehicle" network while still in a virtual environment and thus the efficient implementing of a comprehensive front-loading approach [2]. In enhancing the test bed and simulation structure, additional route, infrastructure, traffic objects and corresponding environmental sensors such as radar, lidar, ultrasonics, 2D and 3D cameras hereby need to be simulated on the powertrain test bed as complete vehicle and environment. So that map-based functions, for example such as for navigation system-based anticipatory energy management (e.g. e-Horizon) will function in the test bed booth, GPS signals of any position on earth can additionally be emulated and transmitted.

The depicted configuration ultimately allows the reproducible evaluating of functional safety, the correct functions as well as performance in terms of emission, consumption, mileage, safety and comfort characteristics in different driving maneuvers and traffic scenarios for the entire system as well as for the subjective driver perceptions.

Due to the rising complexity of the development tasks and the necessity in the future of having to manage comprehensive tool networks instead of toolchains, it will be increasingly difficult for the development engineer to make optimum use of all these tools and properly evaluate the responses and/or results from virtual and real tests and incorporate them into the further development. It will thus be necessary to also make the tools themselves even more "intelligent" as "Smart Cyber-Physical Systems." Such "intelligent" tools will better support the engineer in his work. These tools will know the test object's physical processes as well as the interrelationships between the development tasks and will thereby understand the measurement data; from automatic data plausibility to the efficient analysis and intelligent interpretation of large volumes of data. Nevertheless, these increasingly complex tasks in comprehensive development environments also require generic developer operation—the "networked development engineer"—who can, among other things, also move quickly between different system levels.

LITERATURE

[1] List, H. O.: "Künftige Antriebssysteme im rasch veränderlichen globalen Umfeld", 30$^{th}$ International Vienna Motor Symposium, May 7-8, 2009

[2] List, H.; Schöeggl, P.: "Objective Evaluation of Vehicle Driveability", SAE Technical Paper 980204, 1998, doi: 10.4271/980204

[3] Fischer, R.; Küpper, K.; Schöggl, P.: "Antriebsoptimierung durch Fahrzeug-vernetzung", 35$^{th}$ International Vienna Motor Symposium, May 8-9, 2014

[4] Biermayer, W.; Thomann, S.; Brandl, F.: "A Software Tool for Noise Quality and Brand Sound Development", SAE 01NVC-138, Traverse City, Apr. 30-May 3, 2001

[5] Schrauf, M.; Schöggl, P.: "Objektivierung der Driveability von Automatisier-tem/Autonomem Fahren", 2013 AVL Engine & Environment Conference, Sep. 5-6, 2013, Graz

[6] Hirose, T., Sugiura, T., Weck, T; Pfister, F.: "How To Achieve Real-Life Test Coverage Of Advanced 4-Wheel-Drive Hybrid Applications", CTI Berlin, 2013

LIST OF REFERENCE NUMERALS vehicle 1
fuel processing apparatus 2 first sensor 3a, 3b, 3c, 3d, 3e, 3f, 3g
second sensor 4
control device 5
allocation device 6
evaluation device 7
auxiliary equipment 8
exhaust treatment apparatus 9
electric motor 10
charge storage device 11
exhaust analysis device 12
fuel reservoir 13
transmission 14
wheels 15
differential 16
generator 17
exhaust system 18
electronic unit 19

The invention claimed is:

1. A system for assessing or optimizing an operating behavior of an automobile having a combustion engine or a fuel cell system, wherein the system comprises:
 a plurality of first sensors that measure parameters that characterize a vehicle operating state of the automobile, wherein the plurality of first sensors measure a first parameter that characterizes dynamics of the automobile in at least one driving state and a second parameter that characterizes at least one property selected from a group consisting of: an operating state of at least one auxiliary equipment unit, an operating state of at least one exhaust treatment apparatus, and an operating state of the combustion engine or the fuel cell system;
 at least one second sensor that measures at least one parameter for a current emission of the combustion engine or the fuel cell system;
 a controller that repeats measurements from the plurality of first sensors over a predefined period of time and determines the vehicle operating state on the basis of a first data set with measured values from the plurality of first sensors and predefined parameter ranges which characterize at least one predefined vehicle operating state;
 the controller that allocates a second data set with measured values from the at least one second sensor to the at least one predefined vehicle operating state;
 the controller that determines at least one characteristic value for the assessment or optimization of the operating behavior of the automobile on the basis of the vehicle operating state and the second data set, wherein the characteristic value characterizes an energy efficiency of the automobile or an emission behavior of the combustion engine or the fuel cell system as a function of the vehicle operating state and enables in-depth causes to be concluded for the emission of the combustion engine or a fuel cell system or energy efficiency of the automobile; and
 the controller that outputs the at least one characteristic value for optimizing the operating behavior of the automobile.

2. The system according to claim 1, wherein the controller further determines energy consumed by the automobile on the basis of the second data set, determines energy supplied by the combustion engine or a fuel cell system for the operation on the basis of the first data set, and calculates a ratio of supplied energy to consumed energy.

3. The system according to claim 1, wherein the controller takes multiple measurements such that the first data set comprises a plurality of different vehicle operating states.

4. The system according to claim 1, wherein the automobile comprises at least one electric motor for generating drive of the automobile and a charge storage device, wherein the plurality of first sensors further measures at least one parameter characterizing a state of charge of the charge storage device or at least one parameter characterizing an operating state of the electric motor, and wherein the controller further determines the at least one characteristic value for optimizing the operating behavior of the automobile on the basis of these measured values.

5. The system according to claim 1, wherein the at least one second sensor, which is a component of an exhaust analysis device, is arranged within an exhaust system.

6. An automobile comprising a system in accordance with claim 1.

7. A method for assessing or optimizing an operating behavior of an automobile having a fuel processing apparatus, wherein the method comprises the following procedural steps:
 S1) acquiring a first data set with measured values of a first group of parameters which characterize at least one vehicle operating state of the automobile;
 S2) acquiring a second data set with measured values of at least one parameter of a second group of parameters which include an emission of carbon monoxide, carbon dioxide, hydrocarbons, nitrogen oxide, particulate matter, particle counts, non-methanol hydrocarbons, or particle mass of the particulate matter of the fuel processing apparatus;
 S3) repeating steps S1 and S2 for a predefined period of time until the first data set comprises a plurality of different vehicle operating states;
 S4) comparing the measured values of the first data set to predefined parameter ranges corresponding to the at least one vehicle operating state for the first group of parameters;
 S5) attributing the measured values of the second data set to the at least one vehicle operating state;
 S6) determining at least one characteristic value for the assessing or optimizing of the operating behavior of the automobile on the basis of the at least one vehicle operating state, the second data set, and a sequence of vehicle operating states, wherein the at least one characteristic value characterizes an energy efficiency of the automobile or an emission behavior of the fuel processing apparatus, wherein the measured values of a plurality of second data sets for a same type of driving state are consolidated in the determining of the at least one characteristic value; and
 S7) adapting of an operating strategy of the automobile based on the at least one characteristic value.

8. The method according to claim 7, wherein at least one target value is determined for the at least one parameter of the second group of parameters on the basis of an automobile model, which corresponds to a target energy efficiency or a target emission behavior for the at least one vehicle operating state, and wherein the at least one target value is compared to the first data set for the determination of the at least one characteristic value.

9. The method according to claim 7, wherein a plurality of first and second data sets acquired in steps S1 and S2 are factored into the determination of the at least one characteristic value.

10. The method according to claim 7, wherein the first group of parameters includes a parameter which characterizes a driving state of the automobile and at least one further parameter which characterizes at least one property selected from the following group:
    an operating state of at least one auxiliary equipment unit, an operating state of at least one exhaust treatment apparatus, an ambient temperature, a roadway slope, a position of the automobile, and an operating state of the fuel processing apparatus.

11. The method according to claim 7, further comprising:
determining energy consumed by the automobile on the basis of the second data set;
determining the energy supplied by the fuel processing apparatus for drive of the automobile on the basis of the first data set, wherein the determination of the at least one characteristic value for the assessment or optimization of the operating behavior of the automobile comprises an undercutting of a calculation of a supplied energy to consumed energy ratio.

12. The method according to claim 7, wherein the measured values of the second data set are integrated over a duration of the respective vehicle operating state.

13. The method according to claim 7, further comprising following step:
    adjusting an allocation of the measured values of the second data set to at least one predefined driving state by a signal propagation delay, an exhaust analysis time, an exhaust period, or any combination thereof.

14. The method according to claim 7, wherein the automobile comprises at least one electric motor for drive of the automobile and a charge storage device, wherein the first data set of the further measured values comprises at least one parameter characterizing a state of charge of the charge storage device and/or one parameter characterizing an operating state of the electric motor, and wherein the at least one characteristic value for the assessing or optimizing of the operating behavior of the automobile is further determined on the basis of these measured values.

15. A method for assessing or optimizing an operating behavior of a vehicle having a fuel processing apparatus, wherein the method comprises:
    S1) using a vehicle model to simulate a first group of parameters and at least one parameter of a second group of parameters;
    S2) acquiring a first data set with values of the first group of parameters which characterize at least one vehicle operating state of the vehicle;
    S3) acquiring a second data set with values of the at least one parameter of the second group of parameters for a current emission of the fuel processing apparatus;
    S4) repeating steps S2 and S3 for a predefined period of time;
    S5) comparing the values of the first data set and predefined parameter ranges corresponding to the at least one vehicle operating state for the first group of parameters;
    S6) attributing the values of the second data set to the at least one vehicle operating state;
    S7) determining at least one characteristic value for the assessment or optimization of the operating behavior of the vehicle on the basis of the at least one vehicle operating state and the second data set, wherein the at least one characteristic value characterizes an energy efficiency of the vehicle or an emission behavior of the fuel processing apparatus; and
    S8) adapting of a current operating strategy of the vehicle based on the at least one characteristic value.

16. A non-transitory computer-readable storage medium having stored thereon a computer program, that when executed by one or more processors cause to be performed a method for assessing or optimizing an operating behavior of an automobile having a fuel processing apparatus, wherein the method comprises:
    S1) acquiring a first data set with measured values of a first group of parameters which characterize at least one vehicle operating state of the automobile;
    S2) acquiring a second data set with measured values of at least one parameter of a second group of parameters which include an emission of carbon monoxide, carbon dioxide, hydrocarbons, nitrogen oxide, particulate matter, particle counts, non-methanol hydrocarbons, or particle mass of the particulate matter of the fuel processing apparatus;
    S3) repeating steps S1 and S2 for a predefined period of time until the first data set comprises a plurality of different vehicle operating states;
    S4) comparing the measured values of the first data set to predefined parameter ranges corresponding to the at least one vehicle operating state for the first group of Parameters;
    S5) attributing the measured values of the second data set to the at least one vehicle operating state;
    S6) determining at least one characteristic value for the assessing or optimizing of the operating behavior of the automobile on the basis of the at least one vehicle operating state, the second data set, and a sequence of vehicle operating states, wherein the at least one characteristic value characterizes an energy efficiency of the automobile or an emission behavior of the fuel processing apparatus, wherein the measured values of a plurality of second data sets for a same type of driving state are consolidated in the determining of the at least one characteristic value; and
    S7) adapting of an operating strategy of the automobile based on the at least one characteristic value.

17. A method for assessing or optimizing an operating behavior of an automobile having a fuel processing apparatus, wherein the method comprises the following procedural steps:
    S1) acquiring a first data set with measured values of a first group of parameters for at least one current vehicle operating state;
    S2) acquiring a second data set with measured values of a current emission of the fuel processing apparatus;
    S3) repeating steps S1 and S2 for a predefined period of time;
    S4) comparing the measured values of the first data set to predefined parameter ranges corresponding to the at least one current vehicle operating state for the first group of parameters;
    S5) attributing the measured values of the second data set to the at least one current vehicle operating state;
    S6) determining at least one characteristic value for assessing or optimizing of the operating behavior of the automobile on the basis of the at least one current vehicle operating state and the measured values of the second data set, wherein the at least one characteristic value characterizes an energy efficiency of the automobile or an emission behavior of the fuel processing apparatus; and
    S7) generating and outputting at least one characteristic value of the operating behavior of the automobile.

\* \* \* \* \*